United States Patent
Imamura et al.

(10) Patent No.: US 8,393,724 B2
(45) Date of Patent: Mar. 12, 2013

(54) MAINTENANCE LIQUID FOR INKJET RECORDING, INK SET AND IMAGE FORMING METHOD

(75) Inventors: Mika Imamura, Kanagawa (JP); Yoshimitsu Arai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 261 days.

(21) Appl. No.: 12/858,448

(22) Filed: Aug. 18, 2010

(65) Prior Publication Data

US 2011/0074866 A1    Mar. 31, 2011

(30) Foreign Application Priority Data

Sep. 28, 2009 (JP) ................................. 2009-222804

(51) Int. Cl.
*C09D 11/00* (2006.01)

(52) U.S. Cl. .............. 347/96; 347/95; 347/98; 347/100; 106/31.13; 106/31.6

(58) Field of Classification Search .................... 347/21, 347/28, 95–100; 523/160, 161; 106/31.13, 106/31.6
See application file for complete search history.

(56) References Cited

U.S. PATENT DOCUMENTS

| | | | | |
|---|---|---|---|---|
| 4,040,840 | A * | 8/1977 | Sugiyama et al. | 430/522 |
| 4,612,135 | A * | 9/1986 | Wenzel | 510/423 |
| 4,880,725 | A * | 11/1989 | Hirai et al. | 430/373 |
| 5,811,131 | A * | 9/1998 | Mackles et al. | 424/683 |
| 5,825,380 | A * | 10/1998 | Ichizawa et al. | 347/28 |
| 6,604,809 | B2 * | 8/2003 | Katsuragi et al. | 347/28 |
| 7,597,436 | B2 * | 10/2009 | Momose et al. | 347/95 |
| 7,686,417 | B2 * | 3/2010 | Ota | 347/28 |
| 8,038,254 | B2 * | 10/2011 | Arai et al. | 347/28 |
| 2007/0132807 | A1 * | 6/2007 | Ota | 347/22 |
| 2007/0134451 | A1 * | 6/2007 | Hakamada et al. | 428/32.38 |
| 2007/0222811 | A1 * | 9/2007 | Yanagi | 347/21 |
| 2007/0229577 | A1 * | 10/2007 | Morimoto | 347/21 |
| 2010/0040782 | A1 * | 2/2010 | Arai et al. | 427/256 |
| 2010/0203247 | A1 * | 8/2010 | Kariya et al. | 427/256 |
| 2011/0050795 | A1 * | 3/2011 | Arai et al. | 347/28 |
| 2011/0234692 | A1 * | 9/2011 | Haijima et al. | 347/28 |

FOREIGN PATENT DOCUMENTS

| | | |
|---|---|---|
| JP | 2000-127419 A | 5/2000 |
| JP | 2005-7703 A | 1/2005 |

* cited by examiner

*Primary Examiner* — Matthew Luu
*Assistant Examiner* — Rut Patel
(74) *Attorney, Agent, or Firm* — SOLARIS Intellectual Property Group, PLLC

(57) ABSTRACT

The present invention provides a maintenance liquid for inkjet recording including at least water, an organic solvent, a basic compound and an acidic compound, and having pH of from 6.0 to 8.5.

12 Claims, No Drawings

US 8,393,724 B2

MAINTENANCE LIQUID FOR INKJET RECORDING, INK SET AND IMAGE FORMING METHOD

CROSS-REFERENCE TO RELATED APPLICATION

This application claims priority under 35 USC 119 from Japanese Patent Application No. 2009-222804 filed on Sep. 28, 2009, the disclosure of which is incorporated by reference herein.

BACKGROUND OF THE INVENTION

1. Field of the Invention

The present invention relates to an inkjet maintenance liquid, and an ink set and an image forming method using the maintenance liquid.

2. Related Art

Following rapid progress in the field of information technology in recent years, different types of information processing systems have been developed and recording methods and recording devices suitable for each information processing system have been put to practical use. Among these, inkjet recording methods are widely used because of advantages in that recording is possible on various types of recording media, the hardware (devices) are comparatively inexpensive and compact, and a very low level of noise is generated. Furthermore, with respect to recording using the inkjet recording method, a high quality recorded matter of so-called "photo-like" quality can be obtained.

In general, inkjet recording methods that use a pigment-based ink have better stability than inkjet recording methods that use a dye-based ink.

However, when moisture in a pigment-based ink evaporates and the pigment-based ink solidifies, the pigment ink left as a solid is not re-dissolved. As a result, a nozzle end portion of an inkjet head or like may become clogged, which may cause non-ejection of ink. Further, if ink solidifies at a cap or a wiping portion or the like, wiping may become difficult, which lead to a problem of increase in maintenance burdens.

A liquid used for wiping or washing an area of a nozzle head portion or the like that is soiled with an ink attached thereto is referred to as a wash solution, a maintenance liquid, or a cleaning liquid.

As an maintenance liquid used in the inkjet recording method, an inkjet maintenance liquid containing water and from 0.3% by mass to 15% by mass of alkyleneglycol monoalkylether is disclosed (see, for example, Japanese Patent Application Laid-Open (JP-A) No. 2005-7703).

An inkjet cleaning liquid containing a surfactant, a basic compound and water and having pH of 9 or above is disclosed and there is a description of the cleaning liquid as being useful for cleaning of the pigment-based ink (see, for example, JP-A No. 2000-127419). Further, this publication discloses that triethanolamine and potassium hydroxide are added to increase a pH, thereby the pH being adjusted to 9.2 and 10.1 respectively.

SUMMARY

The present invention has been made in view of the above circumstances and provides a maintenance liquid for inkjet recording including at least water, an organic solvent, a basic compound and an acidic compound, and having pH of from 6.0 to 8.5.

DETAILED DESCRIPTION OF THE INVENTION

1. Maintenance Liquid

The maintenance liquid of the present invention includes at least water, an organic solvent, a basic compound and an acidic compound, and the maintenance liquid is constituted so that pH of the maintenance liquid is from 6.0 to 8.5. If the pH is more than 8.5, adverse affects such as impairments of an ejection head metal or a water repellent-processed film due to the pH are concerned, which is not preferable. On the other hand, if the pH is less than 6.0, detergency decreases and especially when an aggregating system pigment ink is used, aggregation of ink is accelerated and resultantly detergent properties (detergency performance) is significantly deteriorated, which is not preferable.

A combination of the basic compound and the acidic compound that are contained in the maintenance liquid of the present invention has an effect of stably keeping the pH of the maintenance liquid. When the maintenance liquid contains no acidic compound but only the basic compound, pH is increased by the basic compound. As a result, an addition amount of the basic compound is limited to a low level in order to keep the pH in the range of 6.0 to 8.5. Therefore, a pH buffering ability can not be enhanced, so that it becomes difficult to secure sufficient storage stability.

For example, when alkyleneglycols or alkyleneglycolethers are used as a water-soluble organic solvent in the maintenance liquid, the maintenance liquid having the pH buffering ability is useful. Previously, alkyleneglycols or alkyleneglycolethers show excellent detergency performance. However, the alkyleneglycols or alkyleneglycolethers have a problem of pH reduction during storage. The cause is not clear, but it is presumed that the alkyleneglycols or alkyleneglycolethers produce peroxides by oxidation, and further occurrence of acid is caused by a subsequent reaction. With respect to this point, in the recording embodiment using the ink set for inkjet recording described in JP-A No. 2009-190232, that includes an inkjet ink containing s polymer fine particles, a coloring material and water, and a reaction liquid capable of forming an aggregate upon contact with the ink, the ink is forced to aggregate at high speed from the viewpoint of improving image quality and fixing property. As a result, a change of the liquid property to a low pH side is easier to significantly affect aggregation. Accordingly, as for the inkjet ink with which image formation is completed by aggregation due to changes in pH of the ink, reduction in pH of the maintenance liquid induces aggregation of the ink during cleaning whereby deterioration of detergency performance is caused.

In response to that situation, the present invention makes it possible to keep a pH buffering ability at a high level by using a combination of an acidic compound and a basic compound. Especially, by using a combination of a basic compound having a pKa value of 6.0 to 8.5 and an acidic compound, a maintenance liquid showing high pH buffering ability in a preferable pH range, resulting in excellent pH stability effects in particular, is obtained.

The maintenance liquid of the present invention has a pH of preferably from 6.5 to 8.0, and more preferably from 7.0 to 7.8.

In order to secure the pH buffering ability, the maintenance liquid preferably contains a basic compound in an amount of 5 m mol/L or more. From the viewpoints of exhibiting the pH buffering ability while maintaining detergent properties, the amount of the basic compound is more preferably from 10 m mol/L to 100 m mol/L, and further preferably from 10 m mol/L to 75 m mol/L.

The composition of the maintenance liquid is described in detail below.

Basic Compound

The basic compound used in the maintenance liquid of the present invention is not particularly limited, so long as the compound has a pH buffering ability in the above-described pH range. The basic compound preferably has solubility of 5 m mol/L or more with respect to a mixed solvent of water and an organic solvent that are solvent for the maintenance liquid.

The basic compound may be an inorganic compound or an organic compound. Of these basic compounds, an organic basic compound is more preferable from the viewpoints of availability of desired pKa values and solubility with respect to the maintenance liquid.

The basic compound may be a monobasic compound or a polybasic compound. The pKa value of the organic basic compound refers to a pKa value of a conjugate acid.

The pKa value of the basic compound used in the present invention is preferably in the range of 6.0 to 8.5, more preferably from 6.5 to 8.4, and further preferably from 6.8 to 8.3, in view of effectively exhibiting a pH buffering ability in the above-described pH range of the maintenance liquid.

Examples of the basic compound that satisfies the above-described conditions include the following specific compounds.

Cacodylic acid (pKa: 6.2)
2,2-Bis(hydroxymethyl)-2,2',2''-nitrotriethanol (pKa: 6.5)
Pyperazine-N,N'-bis-(2-ethane sulfuric acid) (pKa: 6.8)
Phosphoric acid (pKa 2: 6.86)
Imidazole (pKa: 7.0)
N'-2-hydroxyethylpyperazine-N',2-ethane sulfuric acid (pKa: 7.6)
N-methylmorphorine (pKa: 7.8)
Triethanolamine (pKa: 7.8)
Hydrazine (pKa: 8.11)
Trishydroxymethylaminomethane (pKa: 8.3)

Acidic Compound

The acidic compound used in the maintenance liquid of the present invention is not particularly limited. As the acidic compound, any of inorganic acids or organic acids may be used. Examples of the inorganic acid include hydrochloric acid, sulfuric acid, sulfurous acid, nitric acid, and phosphoric acid. Examples of the organic acid include acetic acid, tartaric acid, salicylic acid, sulfosalicylic acid, and benzoic acid. The acidic compound used in the present invention is preferably an inorganic acid. As the acidic compound, any of weak acids or strong acids may be used. From the viewpoint of high pH buffering ability, strong acids are preferred.

The acidic compound may be used singly or in combination of two or more kinds thereof.

In view of a high pH buffering ability of the maintenance liquid, an additive amount of the acidic compound is preferably an acid equivalent amount of 0.05 to 0.95 equivalents, more preferably from 0.10 to 0.90 equivalents, and further preferably from 0.15 to 0.85 equivalents to the basic compound respectively. When a plurality of acidic compounds is used, it is preferred that a total amount of these acidic compounds is in the aforementioned range.

A preferable combination of the basic compound and the acidic compound is a combination of an organic basic compound and an inorganic acidic compound.

Organic Solvent

The maintenance liquid of the present invention contains an organic solvent. As the organic solvent, a water-soluble organic solvent is preferable. The term "water-soluble" used in the description of the present invention refers to solubility of 1% by mass or more with respect to water at 25° C.

The water-soluble organic solvent may be used by properly selecting from solvents known as a water-soluble organic solvent for maintenance liquid, or water-based ink.

Examples of the water-soluble organic solvent include alcohols, polyvalent alcohols, and ethers. Specific examples of the alcohols include straight or branched alkyl alcohols, such as ethanol, butanol, or isopropanol. Specific examples of the polyvalent alcohols include alkane diols such as ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; and triols such as glycerol, 1,2,4-butane triol, or 1,2,6-hexane triol. Examples of the ethers include alkyl ethers such as diethyl ether, dibutyl ether, ethylmethyl ether, dihexyl ether, or furan; glycol ethers such as diethyleneglycol monoethylether, diethyleneglycol monobutylether, triethyleneglycol monoethylether, triethyleneglycol monobutylether, propyleneglycol monobutylether, dipropyleneglycol monobutylether, dipropyleneglycol t-butylether, diethyleneglycol monohexylether, ethyleneglycol mono-2-ethylhexylether, or diethyleneglycol mono-2-ethylhexylether; and glycerol ethers such as etheleneoxide or propyleneoxide adduct of glycerol.

In addition, 2-pyrrolidone, N-methyl-2-pyrrolidone, 1,3-dimethyl-2-imidazolidinone, formamide, acetamide, dimethylsulfoxide, sorbitol, sorbitan, acetin, diacetin, triacetin, sulfolane, or the like may be used as a water-soluble organic solvent.

These water-soluble organic solvents may be used singly or in combination of two or more kinds thereof.

The water-soluble organic solvent used in the present invention is preferably represented by Formula (1) set forth below.

Formula (1)

In Formula (1), $R_2$ represents an ethylene group, or a propylene group; $R_1$ and $R_3$ each independently represent a hydrogen atom, or an alkyl group having 1 to 4 carbon atoms; and x represents an integer of 1 to 4.

The alkyl group having 1 to 4 carbon atoms refers to a methyl group, an ethyl group, n-propyl group, iso-propyl group, n-butyl group, sec-butyl group, and t-butyl group.

Among maintenance liquids mentioned above, it is preferred that the maintenance liquid contains a solvent having an SP value of 27.5 or less in an amount of at least 50% by mass, more preferably at least 60% by mass, further preferably at least 70% by mass, and especially preferably at least 80% by mass, with respective to a total amount of organic solvent(s).

By the embodiment in which a maintenance liquid contains a solvent having an SP value of 27.5 or less in an amount of at least 50% by mass with respective to a total amount of organic solvent(s), resolvability in the maintenance liquid of a solidified ink stuck to the inkjet head is improved, whereby detergent properties are improved.

The solubility parameter (SP value) of the organic solvent described in the present invention is a value which is represented by the square root of molecular cohesive energy, and can be calculated according to the method described in R. F. Fedors, Polymer Engineering Science, 14, pp. 147-154 (1967). The present invention uses this value.

Specific examples of compounds that are preferable as a water-soluble organic solvent are set forth below. However, the present invention is not limited to these compounds. The figure in parenthesis refers to an SP value of the compound.

Diethylene glycol monoethylether (22.4)
Diethylene glycol monobutylether (21.5)
Triethylene glycol monobutylether (21.1)
Dipropylene glycol monomethylether (21.3)
Dipropylene glycol (27.2)

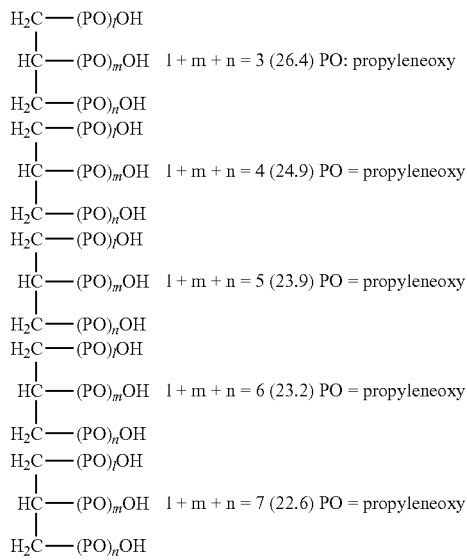

$nC_4H_9O(AO)_4$—H (AO is EO or PO (the ratio of EO:PO=1:1)) (20.1)
$nC_4H_9O(AO)_{10}$—H (AO is EO or PO (the ratio of EO:PO=1:1)) (18.8)
$HO(A'O)_{40}$—H (A'O is EO or PO (the ratio of EO:PO=1:3)) (18.7)
$HO(A''O)_{55}$—H (A''O is EO or PO (the ratio of EO:PO=5:6)) (18.8)
$HO(PO)_3$—H (24.7)
$HO(PO)_7$—H (21.2)
1,2-hexanediol (27.4)

In the above formulae, EO represents an ethyleneoxy group, and PO represents a propyleneoxy group.

These compounds can be respectively used singly or in combination of two or more thereof.

In the present invention, a solvent having the SP value of 27.5 or less is preferably contained in an amount of 50% by mass or more with respect to the total amount of the solvent. Of these solvents having the SP value of 27.5 or less, a solvent having the SP value of 24 or less is more preferable, and a solvent having the SP value of 22 or less is more preferable, from the viewpoints of improvement in resolvability and swelling property of the solidified ink fouling.

The content of the organic solvent in the maintenance liquid is preferably in the range of 1 to 50% by mass with respect to a total mass of the maintenance liquid. If the content of the organic solvent is 1% by mass or more, detergent properties for the water-based ink composition are favorable. Further, by controlling the content of the organic solvent in the range of 50% by mass or less, the detergent properties for the water-based ink composition can be maintained at a high level.

An embodiment, in which at least 50% by mass of the total mass of organic solvent(s) is polyalkyleneoxy alkyl ether, is more preferred.

By the embodiment in which the polyalkyleneoxy alkyl ether is contained in an amount of at least 50% by mass of the total mass of organic solvent(s), resolvability in the maintenance liquid of a solidified ink stuck to the inkjet head is improved, whereby detergent properties are improved.

Especially from the viewpoint of improvement in resolvability of the solidified ink fouling, the content of the polyalkyleneoxy alkyl ether with respect to the total mass of organic solvent(s) is preferably at least 60% by mass, and more preferably at least 70% by mass. With respect to the content of the polyalkyleneoxy alkyl ether, there is no particular upper limit.

As for the polyalkyleneoxy alkyl ether, it is preferable that the alkylene moiety thereof has 1 to 4 carbon atoms and the alkyl moiety thereof has 1 to 4 carbon atoms.

Examples of the polyalkyleneoxy alkyl ether include ethylene glycol monomethylether, ethylene glycol monoethylether, ethylene glycol monobutylether, diethylene glycol monomethylether, diethylene glycol monobutylether, propylene glycol monomethylether, propylene glycol monobutylether, dipropylene glycol monomethylether, triethylene glycol monomethylether, ethylene glycol diacetate, ethylene glycol monomethylether acetate, triethylene glycol monomethylether and triethylene glycol monoethylether.

Surfactant

The maintenance liquid of the present invention may contain at least one surfactant as a surface tension regulator. Preferable examples of the surfactant include anionic surfactants such as fatty acid salts, alkyl carboxylic acid salts, esters of alkyl sulfuric acid salts, alkyl sulfonic acid salts, alkyl benzene sulfonic acid salts, alkyl naphthalene sulfonic acid salts, dialkyl sulfosuccinic acid salts, esters of alkyl phosphoric acid salts, condensation products of formalin and naphthalene sulfonic acid, or esters of polyoxyethylenealkyl sulfuric acid salts; and nonionic surfactants such as polyoxyethylenealkyl ethers, polyoxyethylenealkyl aryl ethers, polyoxyethylene fatty acid esters, sorbitan fatty acid esters, polyoxyethylene sorbitan fatty acid esters, acetylene diol derivatives, polyoxyethylenealkyl amines, glycerol fatty acid esters, or oxyethyleneoxypropylene block copolymers.

Of these surfactants, acetylene diol derivatives, sodium alkyl carboxylate, and sodium alkyl sulfonate are more preferred in view of no occurrence of aggregation reaction with the ink.

The content of the surfactant in the maintenance liquid is preferably from 0.5% by mass to 10% by mass, and more preferably from 1% by mass to 3% by mass, with respect to a total mass of the maintenance liquid. If the content of the surfactant is in the range described above, the maintenance liquid has an advantage in detergent properties.

Water

The maintenance liquid contains water. The content of water is not particularly limited. Especially, a preferable content of water is from 50% by mass to 99% by mass with respect to a total mass of the maintenance liquid.

Other Components

The maintenance liquid of the present invention may further contain other additives as needed. Examples of the other additives include additives such as an anti-fading agent, an emulsion stabilizer, a penetration accelerator, a UV absorbent, an antiseptic agent, an antifungal agent, a pH adjuster, a surface tension regulator (for example, a nonionic surfactant, a cationic surfactant, an anionic surfactant, a betaine surfactant), a defoaming agent, or a viscosity modifier.

Properties or the Like of Maintenance Liquid

The maintenance liquid of the present invention is preferably a liquid that does not cause aggregation at the time when the maintenance liquid is mixed with an ink composition used in the present invention. This is because if aggregation is caused, components such as pigments in the ink composition are further solidified and stuck to an inkjet head or the like, whereby effects of the present invention is reduced.

The viscosity of the maintenance liquid at 20° C. is preferably from 1 mPa·s to 1000 mPa·s, more preferably from 1 mPa·s to less than 500 mPa·s, and further preferably from 2 mPa·s to less than 100 mPa·s from the viewpoint of operability. The method of measuring viscosity in the invention is similar to the method described in the section of reaction liquid.

The maintenance liquid of the present invention is preferably a substantially colorless liquid that contains substantially no pigment.

The solid content of the maintenance liquid at 25° C. is not particularly limited. In view of preventing solid residues from being formed after cleaning, the solid content is preferably 5% by mass or less, and more preferably 2% by mass or less.

In the present invention, from the viewpoint of prevention of drying, improvement of wetness, and improvement of permeation, the above-described solvent may be used with other solvent in such an amount that there is no disruption of effects of the present invention.

A water-soluble organic solvent that can be used in combination may be used by properly selecting from the solvents described above as a water-soluble organic solvent.

From the viewpoint of improvement in removability of solidified ink fouling, a total content of the water-soluble organic solvent(s) is preferably at least 5% by mass, more preferably from 5% by mass to 90% by mass, and further preferably from 10% by mass to 80% by mass, with respect to a total maintenance liquid.

The solid content (25° C.) of the maintenance liquid is not particularly limited. However, from the viewpoint of preventing solid residues from being formed after cleaning, the solid content is preferably 5% by mass or less, and more preferable 2% by mass or less.

2. Ink Composition

The ink composition used in the present invention is a water-based ink composition, and preferably a water-based ink composition containing at least a pigment and polymer particles.

Each component contained in the ink composition is described below.

Pigment

The ink composition used in the invention contains at least one pigment.

The pigment used in the invention is not specifically limited, and may be appropriately selected depending on the purposes. For example, the pigment may be either an organic pigment or an inorganic pigment, or both of these can be used in combination.

Examples of the organic pigment include azo pigments, polycyclic pigments, dye chelates, nitro pigments, nitroso pigments and aniline black. In particular, azo pigments and polycyclic pigments are preferable.

Examples of the azo pigments include an azo lake pigment, an insoluble azo pigment, a condensed azo pigment, and a chelate azo pigment.

Examples of the polycyclic pigments include a phthalocyanine pigment, a perylene pigment, a perynone pigment, an anthraquinone pigment, a quinacridone pigment, a dioxazine pigment, an indigo pigment, a thioindigo pigment, an isoindolinone pigment, and a quinofraron pigment.

Examples of the dye chelates include basic dye chelate pigments and acid dye chelate pigments.

Examples of the inorganic pigments include titanium oxide, iron oxide, calcium carbonate, barium sulfate, aluminum hydroxide, barium yellow, cadmium red, chrome yellow, and carbon black. Among these pigments, carbon black is particularly preferable. The carbon black may be, for example, a carbon black manufactured by a known method such as a contact method, a furnace method or a thermal method.

The pigment may be used singly or in combination of two or more thereof, each of which may be selected from the above classes of pigments and may belong to the same class as each other or different classes from each other.

The pigment used in the present invention is preferably used as water dispersions of at least one pigment selected from the following (1) to (4), from the viewpoint of liquid stability and ejection stability.

(1) An encapsulated pigment: a polymer emulsion of a pigment embedded in each water-insoluble resin fine particle; more specifically, water dispersions of pigment particles each coated with a hydrophilic water-insoluble resin so as to impart hydrophilic properties to the surface of the pigment particle.

(2) A self-dispersible pigment: a pigment having at least one hydrophilic group on a surface thereof and exhibiting at least one of water-dispersibility or water-solubility in the absence of a dispersant; more specifically, a pigment prepared by subjecting the surfaces of pigment particles (such as carbon black particles) to an oxidizing treatment so as to impart hydrophilic properties to the pigment particles and so as to enable the pigment itself to disperse in water.

(3) A resin dispersed pigment: a pigment dispersed using a water-soluble polymer compound having a weight average molecular weight of 50,000 or less.

(4) A surfactant-dispersed pigment: a pigment dispersed using a surfactant.

Among these pigments, the encapsulated pigment (1), the self-dispersible pigment (2) and the resin dispersed pigment (3) are preferable, and the encapsulated pigment (1) and the resin dispersed pigment (3) are particularly preferable.

Ratio of Pigment Dispersant to Pigment

The ratio (mass ratio) of a content of a pigment dispersant to a content of a pigment (pigment dispersant/pigment) in the ink composition is preferably from 25/100 to 140/100, and more preferably from 25/100 to 50/100. When the ratio is 25/100 or more, the dispersion stability and rub resistance may tend to be improved. When the content ratio is 140/100 or less, the dispersion stability may tend to be improved as well.

From the viewpoint of coloring property, granularity, ink stability, and ejection reliability, the content of pigment in a total ink composition used in the present invention is preferably from 0.1% by mass to 15% by mass, more preferably from 0.5% by mass to 12% by mass, and further preferably from 1% by mass to 10% by mass.

Encapsulated Pigment

The encapsulated pigment is described in detail.

The resin used in the encapsulated pigment is not specifically limited. As the resin, however, it is preferable to use a hydrophilic and water-insoluble polymer compound that is self-dispersible or dissolvable in a mixed solvent of water and a water-soluble organic solvent and that has an anionic (acidic) group. In general, the number average molecular weight of the resin is preferably in the range of about 1,000 to about 100,000, and particularly preferably in the range of about 3,000 to about 50,000. The resin is preferably a resin that can dissolve in an organic solvent to form a solution. When the number average molecular weight of a resin is within the above ranges, the resin can exhibit sufficient function as a cover layer on pigment particles or as a coated layer of an ink composition. The resin is preferably used in the form of an alkali metal salt or an organic amine salt.

The resin used for the encapsulated pigment may be, for example, a material having an anionic group, and examples thereof include thermoplastic, thermosetting, or modified resins that are composed of the following types of resin: a polymer compound such as an acrylic resin, an epoxy resin, a polyurethane resin, a polyether resin, a polyamide resin, an unsaturated polyester resin, a phenol resin, a silicone resin, or a fluorine resin; a polyvinyl resin such as polyvinyl chloride, polyvinyl acetate, polyvinyl alcohol or polyvinyl butyral; a polyester resin such as an alkyd resin or a phthalic acid resin; an amino resin such as a melamine resin, a melamine-formaldehyde resin, an amino alkid co-condensed resin, a urea formaldehyde resin, or a urea resin; and copolymers or mixtures of two or more of these resins.

Of the above resins, an anionic acrylic resin can be obtained, for example, by polymerizing, in a solvent, an acrylic monomer having an anionic group (hereinafter, referred to as an anionic group-containing acrylic monomer) and, optionally, one or more other monomers copolymerizable with the anionic group-containing acrylic monomer. Examples of the anionic group-containing acrylic monomer include an acrylic monomer having one or more anionic groups selected from the group consisting of a carboxylic group, a sulfonic acid group and a phosphonic group. Among these acrylic monomers, an acrylic monomer having a carboxyl group is especially preferable.

Examples of the acrylic monomer having a carboxyl group include acrylic acid, methacrylic acid, crotonic acid, ethacrylic acid, propylacrylic acid, isopropylacrylic acid, itaconic acid and fumaric acid. Among these monomers, acrylic acid and methacrylic acid are preferable.

An encapsulated pigment can be manufactured by a conventional physical and/or chemical method by using the above components. According to a preferable embodiment of the present invention, the encapsulated pigment can be manufactured by the methods described in JP-A Nos. 9-151342, 10-140065, 11-209672, 11-172180, 10-25440, or 11-43636.

Specifically, examples of the method for manufacturing the encapsulated pigment include a phase-inversion emulsification method and an acid precipitation method described in JP-A Nos. 9-151342 and 10-140065.

The phase-inversion emulsification method is a self-dispersion (phase-inversion emulsification) method, which may basically include a process of dispersing a fused mixture of a self-dispersible or water-soluble resin and a pigment in water. The fused mixture may contain the above-described curing agent or polymer compound as a component thereof. The "fused mixture" refers to a state in which undissolved components are mixed, or a state in which dissolved components are mixed, or a state including both of the above states. Specific examples of the phase-inversion method include that described in JP-A No. 10-140065.

For more detailed information about the phase-inversion emulsification method and the acid precipitation method, JP-A Nos. 9-151342 and 10-140065 can be referred to.

Water-Insoluble Resin

The water-insoluble resin used as a pigment dispersant in the present invention is preferably a hydrophilic and water-insoluble resin having a hydrophilic structural unit (a) and a hydrophobic structural unit (b). The water-insoluble resin may further have another structural unit which is different from the hydrophilic structural unit (a) and the hydrophobic structural unit (b) in accordance with necessity.

Hydrophilic Structural Unit (a)

There is no particular limitation on the hydrophilic structural unit (a) insofar as it is derived from a hydrophilic group-containing monomer, and may be derived from one hydrophilic group-containing monomer or may be derived from two or more hydrophilic group-containing monomers. The hydrophilic group is not particularly limited and may be a dissociative group or a nonionic hydrophilic group.

The dissociative group and/or a nonionic hydrophilic group may be incorporated into the water-insoluble resin used in the present invention, by using a monomer having a dissociative group and/or a monomer having a nonionic hydrophilic group.

The dissociative group may be preferable from the viewpoints of stabilizing the emulsion state or the dispersion state. Examples of the dissociative group include a carboxyl group, a phosphoric acid group, and a sulfonic acid group. Among these groups, the carboxyl group is preferable from the viewpoint of the dispersion stabilizing property when the ink composition is formed therewith.

The hydrophilic group-containing monomer is preferably a dissociative group-containing monomer, and specifically, the hydrophilic group-containing monomer is preferably a dissociative group-containing monomer having a dissociative group and an ethylenically unsaturated bond. Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl(meth)acrylate, and bis-(3-sulfopropyl)-itaconic acid ester. Specific examples of the unsaturated phosphoric acid monomer include vinyl phosphoric acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among these dissociative group-containing monomers, the unsaturated carboxylic acid monomer is preferable, and acrylic acid and methacrylic acid are more preferable, from the viewpoints of dispersion stability and ejection stability. Accordingly, the hydrophilic structural unit (a) preferably includes a structural unit derived from (meth)acrylic acid.

Examples of the hydrophilic structural unit (a) further include a structural unit derived from a monomer having a nonionic hydrophilic group. The monomer forming a structural unit having a nonionic hydrophilic group is not particularly limited as long as it has both a nonionic hydrophilic functional group and a functional group (for example, an ethylenically unsaturated bond) that can form a polymer, and may be selected from monomers known in the art. Vinyl monomers are preferable from the viewpoints of availability, handleability and general versatility.

Examples of the hydrophilic structural unit (a) include hydrophilic functional group-containing vinyl monomers such as hydrophilic functional group-containing (meth)acrylates, hydrophilic functional group-containing (meth)acrylamides, or hydrophilic functional group-containing vinyl esters.

Examples of the "hydrophilic functional group" as used herein include a hydroxyl group, an amino group, an amide group (in which nitrogen atom is unsubstituted), and alkylene oxides such as polyethylene oxide or polypropylene oxide described below.

Preferable examples of the hydrophilic structural unit (a) include hydroxyethyl(meth)acrylate, hydroxybutyl(meth)acrylate, (meth)acrylamide, aminoethyl acrylate, aminopropyl acrylate, and alkylene oxide polymer-containing (meth)acrylates.

The hydrophilic structural unit having a nonionic hydrophilic group may be incorporated into the water-insoluble resin by forming a polymer chain of the water-insoluble resin by polymerizing monomers corresponding to the hydrophilic structural unit. Alternatively, the hydrophilic structural unit having a nonionic hydrophilic group may be provided in the water-insoluble resin by introducing a hydrophilic functional group into a polymer chain of the water-insoluble resin which has been formed by polymerization.

The hydrophilic structural unit having a nonionic hydrophilic group is more preferably a hydrophilic structural unit having an alkylene oxide structure. From the viewpoint of hydrophilicity, the alkylene moiety of the alkylene oxide structure preferably has 1 to 6 carbon atoms, more preferably has 2 to 6 carbon atoms, and still more preferably has 2 to 4 carbon atoms. The degree of polymerization of the alkylene oxide structure is preferably 1 to 120, more preferably 1 to 60, and still more preferably 1 to 30.

In one preferable embodiment, the hydrophilic structural unit having a nonionic hydrophilic group is a hydroxyl group-containing hydrophilic functional unit. The number of a hydroxyl group(s) in the structural unit, although being not particularly limited, is preferably 1 to 4, more preferably 1 to 3, and still more preferably 1 to 2, from the viewpoints of the hydrophilicity of the water-insoluble resin and compatibility with a solvent and other monomers at the time of polymerization.

For example, the content ratio of the hydrophilic structural unit may vary depending on the content ratio of the hydrophobic structural unit (b) described below. For example, when the water-insoluble resin is composed exclusively of acrylic acid and/or methacrylic acid (hydrophilic structural unit (a)) and the hydrophobic structural unit (b) described below, the content ratio of acrylic acid and/or methacrylic acid may be determined by "100−(the hydrophobic structural unit) (mass %)".

The hydrophilic structural units (a) may be used singly or as a mixture of two or more thereof.

The content ratio of the hydrophilic structural unit (a) is preferably in the range of from more than 0% by mass to 15% by mass, more preferably in the range of 2% by mass to 15% by mass, still more preferably in the range of 5% by mass to 15% by mass, and further more preferably in the range of 8% by mass to 12% by mass, with respect to the total amount of the water-insoluble resin.

Hydrophobic Structural Unit (b)

The hydrophobic structural unit (b) preferably includes a structural unit including an aromatic ring which is linked to, through a linking group, an atom which configures a main chain structure of the water-insoluble resin.

The hydrophobic structural unit including the aromatic ring maintains an adequate distance between the aromatic ring, which is hydrophobic, and a hydrophilic structural unit in the water-insoluble resin because the aromatic ring is linked to an atom which configures a main chain structure of the water-insoluble resin through a linking group, so that the aromatic ring is not directly linked to the atom which configures a main chain structure of the water-insoluble resin. Therefore, an interaction between the water-insoluble resin and the pigment can easily occur, whereby the water-insoluble resin can be firmly adsorbed to the pigment, so that the dispersibility of the pigment can be improved.

Among the structural unit including an aromatic ring which is linked to, through a linking group, an atom which configures a main chain structure of the water-insoluble resin, a structural unit represented by the following Formula (2) is preferable from the viewpoint of facilitating easy granulation of the pigment.

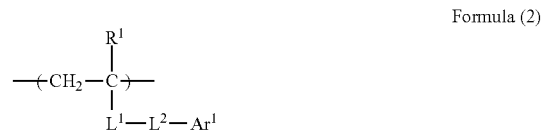

Formula (2)

In Formula (2), $R^1$ represents a hydrogen atom, a methyl group or a halogen atom; $L^1$ represents *—COO—, *—OCO—, *—CONR$^2$—, *—O—, or a substituted or unsubstituted phenylene group wherein the side designated by "*" in each structure corresponds to the side linked to the main chain of the water-insoluble resin; and $R^2$ represents a hydrogen atom or an alkyl group having 1 to 10 carbon atoms. Here, examples of the substituent which the phenylene group may have include, but are not limited to, a halogen atom, an alkyl group, an alkoxy group, a hydroxyl group, and a cyano group.

$L^2$ represents a single bond or a divalent linking group having 1 to 30 carbon atoms. If $L^2$ represents a divalent linking group, the linking group preferably has 1 to 25 carbon atoms, more preferably has 1 to 20 carbon atoms, and still more preferably has 1 to 15 carbon atoms. Particularly preferably, $L^2$ represents an alkyleneoxy group having 1 to 25 carbon atoms (more preferably 1 to 10 carbon atoms), an imoino group (—NH—), a sulfamoyl group, a divalent linking group containing an alkylene group such as an alkylene group having 1 to 20 carbon atoms (more preferably 1 to 15 carbon atoms) or ethyleneoxide group (—(CH$_2$CH$_2$O)$_n$—, in which n is an integer of from 1 to 6), and a group containing two or more of these in combination.

In Formula (2), Ar$^1$ represents a monovalent group derived from an aromatic ring. The aromatic ring represented by Ar$^1$ is not particularly limited, and examples thereof include a benzene ring, a condensed aromatic ring having 8 or more carbon atoms, a heterocyclic ring condensed with an aromatic ring, and connected benzene rings in which two or more benzene rings are connected. Details of the condensed aromatic ring having 8 or more carbon atoms and a heterocyclic ring condensed with an aromatic ring are the same as the already-described ones.

Among the structural units represented by Formula (2), it is a preferable combination that $R^1$ represents a hydrogen atom or a methyl group, $L^1$ represents *—COO—, and $L^2$ represents a divalent linking group having 1 to 25 carbon atoms and containing an alkyleneoxy group and/or an alkylene group. As a more preferable combination, $R^1$ represents a hydrogen atom or a methyl group, $L^1$ represents *—COO—, and $L^2$ represents *—(CH$_2$—CH$_2$—O)$_n$— (where n represents an average of numbers of repeating units and is from 1 to 6).

The condensed aromatic ring having 8 or more carbon atoms is an aromatic compound having 8 or more carbon atoms and containing: an aromatic ring formed by condensation of two or more benzene rings; and/or a ring formed by at least one aromatic ring and an alicyclic hydrocarbon condensed with the aromatic ring. Specific examples thereof include naphthalene, anthracene, fluorene, phenanthrene, and acenaphthene.

The heterocyclic ring condensed with an aromatic ring refers to a compound in which an aromatic compound (preferably a benzene ring) containing no hetero atom and a cyclic compound containing a hetero atom are condensed with each other. Here, the cyclic compound containing a hetero atom is preferably a 5-membered ring or a 6-membered ring. Preferable examples of the hetero atom include a nitrogen atom, an oxygen atom, and a sulfur atom. The cyclic compound containing a hetero atom may contain plural hetero atoms, and in this case, the hetero atoms may be the same or different from each other. Specific examples of the heterocyclic ring condensed with an aromatic ring include phthalimide, acridone, carbazole, benzoxazole, and benzothiazole.

Specific examples of a monomer that can form the structural unit represented by Formula (2) are shown below, although the invention is not restricted to the following examples.

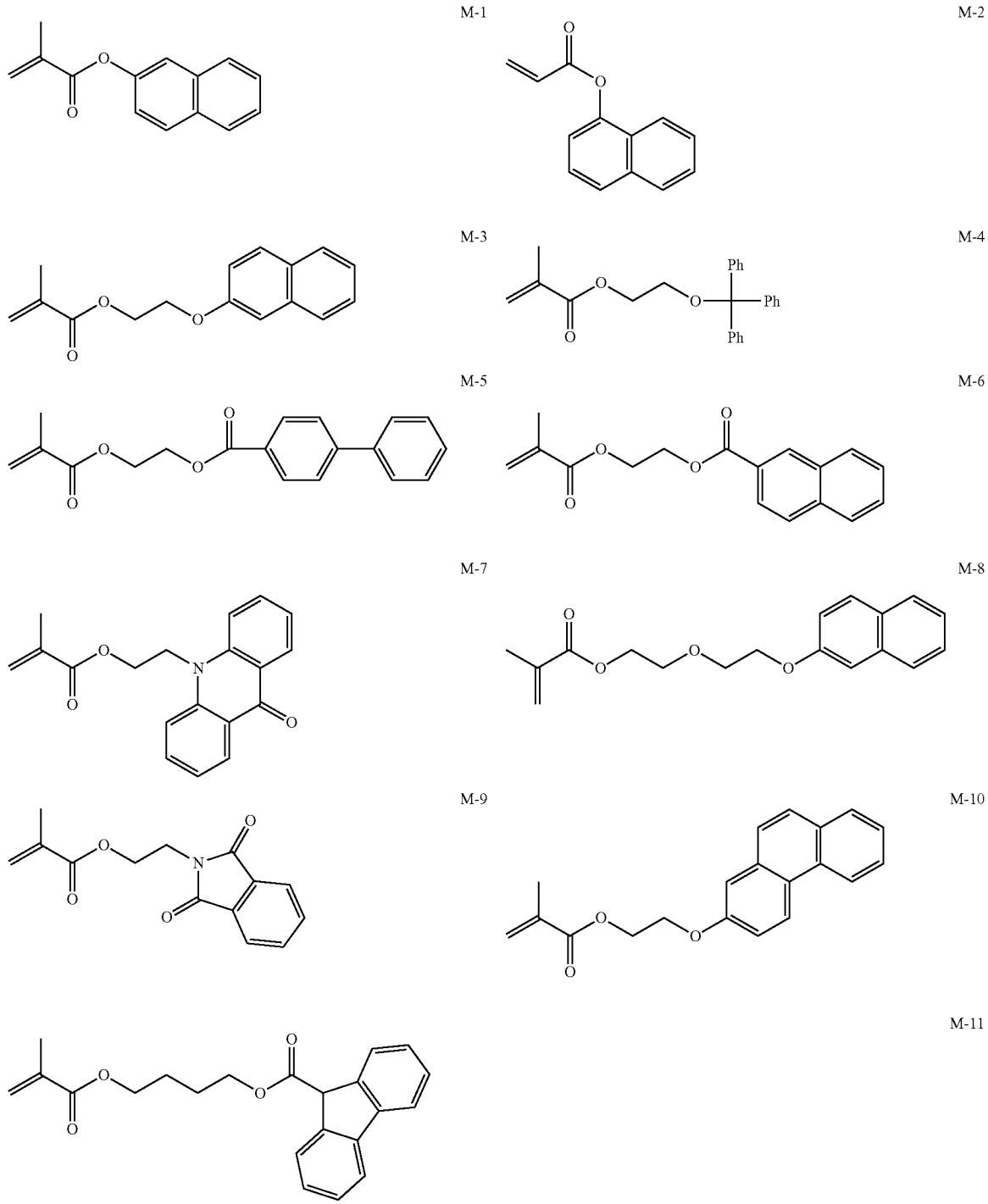

-continued
M-12
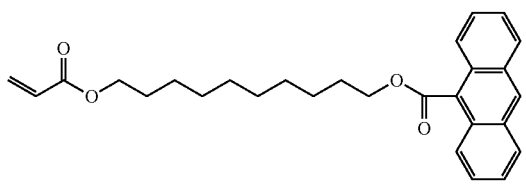
M-13
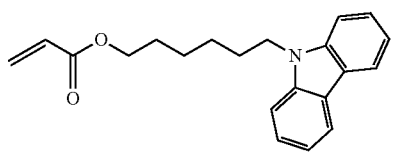
M-14
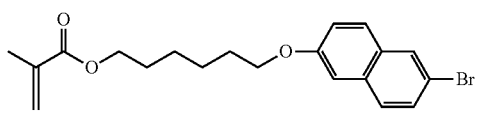
M-15
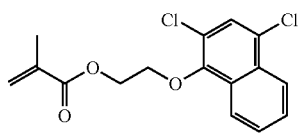
M-16
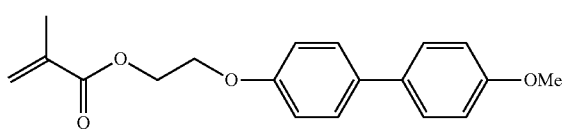
M-17
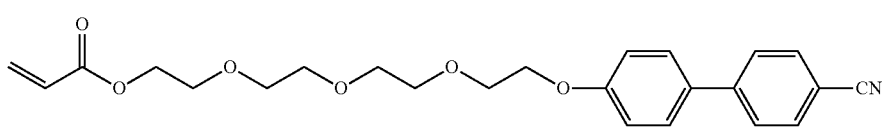
M-18
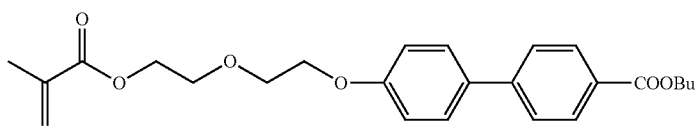
M-19
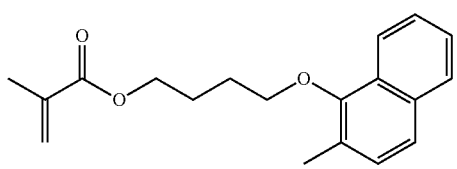
M-20
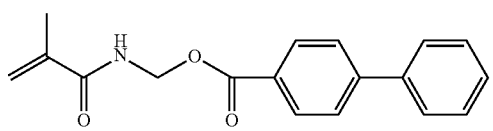
M-21
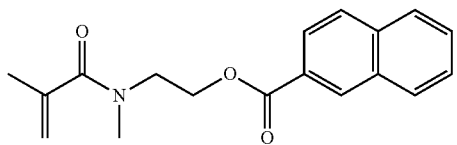
M-22
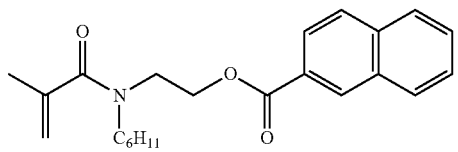
M-23
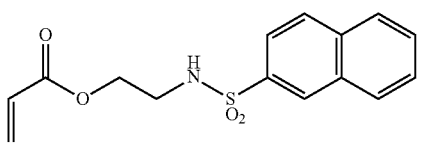
M-24
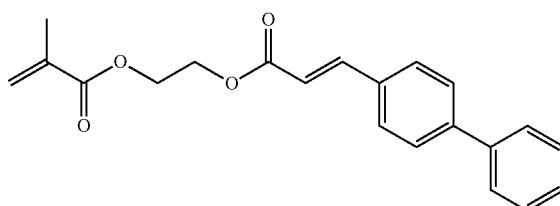
M-25
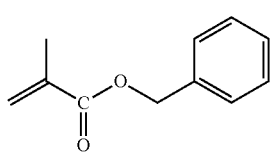
M-26
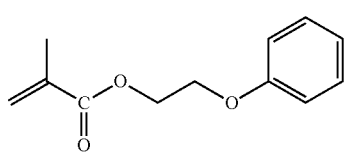

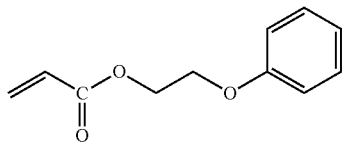

M-27

Among the structural units represented by Formula (2), structural unit derived from a compound selected from the group consisting of benzyl methacrylate, phenoxyethyl acrylate and phenoxyethyl methacrylate may be preferable in consideration of the dispersion stability. In preferable embodiments, the water-insoluble resin contains one or more of the structural units selected from these as the hydrophobic structural unit (b).

The content of the hydrophobic structural unit having an aromatic ring which is linked to, through a linking group, an atom which configures the main chain of the water-insoluble resin is preferably 40% by mass or more, more preferably from 40% by mass to less than 75% by mass, still more preferably from 40% by mass to less than 70% by mass, and particularly preferably from 40% by mass to less than 60% by mass, with respect to the total amount of the water-insoluble resin, in consideration of dispersion stability of the pigment and ejection stability and detergent property of the ink composition.

The content of the aromatic ring which is linked to, through a linking group, an atom which configures the main chain of the water-insoluble resin is preferably from 15% by mass to 27% by mass, more preferably from 15% by mass to 25% by mass, and particularly preferably from 15% by mass to 20% by mass, with respect to the total amount of the water-insoluble resin, from the viewpoint of improving rubbing resistance. When the content of the aromatic ring is in the above ranges, rubbing resistance, ink stability and ink ejection reliability may be enhanced.

From the viewpoint of dispersion stability, the hydrophobic structural unit (b) preferably has a structural unit derived from an alkyl (meth)acrylate having 1 to 4 carbon atoms in its alkyl group (a (meth)acrylic acid ester of an alkyl having 1 to 4 carbon atoms). The scope of "(meth)acrylic acid" include acrylic acid and methacrylic acid Specific examples of the alkyl(meth)acrylate include methyl(meth)acrylate, ethyl(meth)acrylate, (iso)propyl (meth)acrylate, and (iso- or tertiary-)butyl(meth)acrylate. The number of carbon atoms in the alkyl moiety of the alkyl ester is in the range of from 1 to 4, and is preferably 1 or 2.

From the viewpoint of dispersion stability, the content ratio of the "structural unit derived from an alkyl(meth)acrylate having 1 to 4 carbon atoms" in the water-insoluble resin is preferably 15% by mass or more with respect to the total amount of the water-insoluble resin. The content ratio of this structural unit is preferably 20% by mass to 60% by mass, more preferably 20% by mass to 50% by mass.

As mentioned above, from the viewpoint of further increasing the dispersion stability, the hydrophobic structural unit (b) contains preferably the structural unit having an aromatic ring bonded to an atom for forming the main chain through a linking group in an amount of 40% by mass or more (more preferably from 40% by mass to 75% by mass, further more preferably from 40% by mass to 70% by mass, particularly preferably from 40% by mass to 60% by mass) with respect to the total mass of the water-insoluble resin, and the structural unit derived from an alkyl ester having 1-4 carbon atoms of (meth)acrylic acid in an amount of 15% by mass or more (more preferably from 20% by mass to 60% by mass, particularly preferably from 20% by mass to 50% by mass) with respect to the total mass of the water-insoluble resin.

Examples of the hydrophobic structural unit (b) other than those described above include structural units which do not belong to the hydrophilic structural unit (a) (for example, structural units which do not have a hydrophilic functional group) and which are derived from vinyl monomers such as (meth)acrylamides, styrenes or vinyl esters, and (meth)acrylates such as alkyl esters (number of carbon atoms: 1 to 4) of (meth)acrylic acid. These structural units may be used singly or as a mixture of two or more thereof Examples of the (meth)acrylamides include N-cyclohexyl (meth)acrylamide, N-(2-methoxyethyl)(meth)acrylamide, N,N-diallyl(meth)acrylamide and N-allyl(meth)acrylamide.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, and chloromethylstyrene; hydroxystyrene protected by a group (for example, t-Boc) that can be deprotected by an acidic material; methyl vinylbenzoate, α-methylstyrene, and vinyl naphthalene. Among them, styrene and α-methylstyrene are preferable.

Examples of the vinyl esters include vinyl acetate, vinyl chloroacetate, vinyl propionate, vinyl butyrate, vinyl methoxyacetate, and vinyl benzoate. Among them, vinyl acetate is preferable.

Examples of the (meth)acrylates include methyl(meth) acrylate, ethyl(meth)acrylate, (iso)propyl(meth)acrylate, and (iso- or tertiary-)butyl(meth)acrylate.

With respect to the composition of the hydrophilic structural unit (a) and the hydrophobic structural unit (b), the content of the hydrophobic structural unit (b), although varying depending on the degrees of the hydrophilicity and hydrophobicity of these units, is preferably higher than 80% by mass, more preferably higher than 85% by mass, with respect to the total amount of the water-insoluble resin. In other words, the content of the hydrophilic structural unit (a) is preferably in the range of 15% by mass or less, with respect to the total amount of the water-insoluble rein. When the content of the hydrophilic structural unit (a) is 15% by mass or less, the component which is dissolved by itself in an aqueous medium without contributing to dispersion of the pigment is reduced. Therefore, the dispersed state of the pigment can be kept excellent, and the viscosity can be suppressed from increasing, and thus the water-insoluble resin when used in an ink for inkjet recording can improve ejection performance.

The water-insoluble resin used in the present invention may be a random copolymer in which the respective structural units are randomly introduced or a block copolymer in which the respective structural units are regularly introduced. When the water-insoluble resin is a block copolymer, the order of introducing the respective structural units during the synthesis of the block polymer is not limited; further, the same structural unit may be used two or more times during the synthesis of the block copolymer. The water-insoluble resin is preferably a random copolymer in consideration of the versatility and manufacturability.

The acid value of the water-insoluble resin used in the present invention is preferably 100 mg KOH/g or less, more preferably from 30 mg KOH/g to 100 mg KOH/g, further preferably from 30 mg KOH/g to 85 mg KOH/g, and particularly preferably from 50 mg KOH/g or more to 85 mg KOH/g, in consideration of the pigment dispersibility and storage stability.

Here, the acid value is defined as the mass (mg) of KOH required for completely neutralizing 1 g of the water-insoluble resin, and can be measured in accordance with the method described in JIS Standard (JIS-K0070 (1992); the disclosure of which is incorporated by reference herein).

The molecular weight of the water-insoluble resin used in the invention is, in terms of a weight average molecular weight (Mw), preferably 30,000 or more, more preferably from 30,000 to 150,000, still more preferably from 30,000 to 100,000, and particularly preferably from 30,000 to 80,000.

When the water-insoluble resin has a molecular weight which is 30,000 or more, steric repulsion effect that the water-insoluble resin can exerts as a dispersant may improve and due to steric effect, the water-insoluble resin tends to easily adsorb to the pigment.

The number-average molecular weight (Mn) of the water-insoluble resin used in the present invention is preferably in the range of about 1,000 to about 100,000, more preferably in the range of about 3,000 to about 50,000. When the number-average molecular weight is in the range defined above, the water-insoluble resin may function as a coating film on the pigment or function as a coating film of the ink. The water-insoluble resin employed in the present invention is used preferably in the form of an alkali metal salt or an organic amine salt.

The molecular weight distribution (weight average molecular weight/number average molecular weight) of the water-insoluble resin used in the present invention is preferably from 1 to 6, and more preferably from 1 to 4. It is preferable that the molecular weight distribution is set within the above ranges in consideration of the dispersion stability and ejection stability of the ink composition.

Each of the number average molecular weight and the weight average molecular weight used herein is a molecular weight value obtained by measuring a molecular weight with a GPC analyzer using columns of TSKgel GMHxL, TSKgel G4000HxL and TSKgel G2000HxL (trade names, manufactured by Tosoh Corporation) and then converting the measured value using polystyrene as a reference material; the solvent used for GPC is THF and the detection is conducted by a differential refractometer.

The water-insoluble resin used in the present invention can be synthesized using various polymerization methods, such as a solution polymerization, a precipitation polymerization, a suspension polymerization, a bulk polymerization, or an emulsion polymerization. The polymerization reaction can be performed by known operations such as a batch system, a semi-continuous system or a continuous system.

Examples of the method of polymerization initiation include a method using a radical initiator and a method using exposure to light or radiation. These polymerization methods and the polymerization initiation methods are described, for example, in Teiji Tsuruta, "Kobunshi Gousei Houhou" (Polymer Synthesis Method), revised edition (Nikkan Kogyo Shimbun (1971)) and Takayuki Otsu and Masayoshi Kinoshita, "Koubunshi Gousei-no Jikken-ho" (Experimental Method of Polymer Synthesis), (Kagaku-Dojin (1972)), pp. 124-154.

Specifically, the water-insoluble resin may be produced by subjecting a mixture which contains monomers and may further contain an organic solvent and a radical polymerization initiator in accordance with necessity to copolymerization under inert gas atmosphere. Among the polymerization methods, the solution polymerization method using a radical initiator is particularly preferable. Examples of the solvent used in the solution polymerization method include ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These organic solvents may be used singly, or may be used in the form of a mixture of two or more kinds thereof, or may be mixed with water and used as a mixed solvent.

The polymerization temperature should be set in consideration of, for example, the molecular weight of the polymer to be formed and the kind of the initiator. In general, the polymerization temperature is from about 0° C. to about 100° C. It is preferable to perform polymerization at a temperature of from 50° C. to 100° C.

The reaction pressure can be suitably selected, and is usually from about 1 kg/cm$^2$ to about 100 kg/cm$^2$, and is preferably from about 1 kg/cm$^2$ to about 30 kg/cm$^2$. The reaction time may be from about 5 hours to about 30 hours. The obtained resin may be purified by reprecipitation or the like.

Preferable examples of the water-insoluble resin used in the present invention are shown below, while the invention is not limited thereto. Herein, a, b, c, d, e, f, g, h, and i each represent a ratio of the respective unit in terms of % by mass with respect to the total amount of the exemplified water-insoluble resin.

$$-(CH_2-\underset{\underset{CH_2-C_6H_5}{|}}{\overset{\overset{R^{11}}{|}}{C}})_a- \quad -(CH_2-\underset{\underset{COOH}{|}}{\overset{\overset{R^{21}}{|}}{C}})_b- \quad -(CH_2-\underset{\underset{COO-R^{32}}{|}}{\overset{\overset{R^{31}}{|}}{C}})_c-$$

| | $R^{11}$ | $R^{21}$ | $R^{31}$ | $R^{32}$ | a | b | c | Mw |
|---|---|---|---|---|---|---|---|---|
| B-1 | CH$_3$ | CH$_3$ | CH$_3$ | —CH$_3$ | 60 | 10 | 30 | 46000 |
| B-2 | H | H | H | —CH$_3$ | 60 | 10 | 30 | 50000 |
| B-3 | CH$_3$ | CH$_3$ | CH$_3$ | —CH$_2$CH$_3$ | 61 | 10 | 29 | 43000 |
| B-4 | CH$_3$ | CH$_3$ | CH$_3$ | —CH$_2$CH$_2$CH$_2$CH$_3$ | 61 | 9 | 30 | 51000 |
| B-5 | CH$_3$ | CH$_3$ | CH$_3$ | —CH(CH$_3$)$_2$ | 60 | 9 | 31 | 96000 |
| B-6 | H | H | H | —C(CH$_3$)$_3$ | 60 | 10 | 30 | 32000 |
| B-7 | CH$_3$ | CH$_3$ | CH$_3$ | —CH$_2$CH(CH$_3$)$_2$ | 70 | 5 | 25 | 75000 |

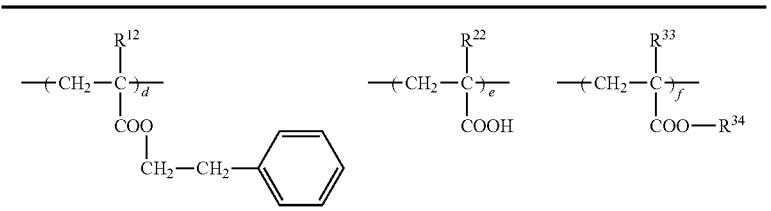

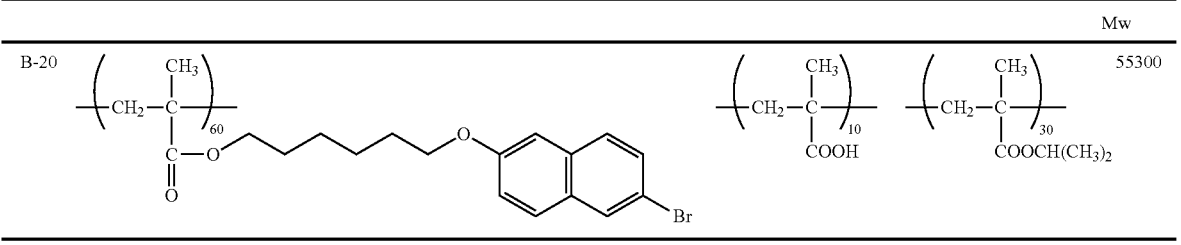

Self-Dispersible Pigment

In the present invention, (2) a self-dispersible pigment is also recited as a preferable example. The self-dispersing pigment refers to a pigment to the surface of which a lot of hydrophilic functional groups and/or salts thereof (hereinafter, referred to as dispersibility-imparting groups) are bonded directly or through an alkyl group, an alkyl ether group, an aryl group, or the like, whereby the pigment is dispersible in an aqueous medium without a dispersant. Herein, the term "dispersible in an aqueous medium without a dispersant" refers to the state in which a pigment is dispersible in an aqueous medium without a dispersant for dispersing the pigment.

The ink containing a self-dispersible pigment as a colorant (coloring agent) is not necessary to contain the above-described dispersant that is contained to disperse an ordinary pigment. As a result, there are almost no chances that foam formation is induced by reduction in defoaming properties arising from a dispersant. Therefore, an ink having excellent ejection properties is easy to be prepared.

Examples of the dispersibility-imparting groups that are bonded to the surface of the self-dispersible pigment include —COOH, —CO, —OH, —SO$_3$H, —PO$_3$H$_2$, quaternary ammonium, and salts thereof. These groups can be produced by subjecting the pigment as a raw material to a physical processing or a chemical processing so that a dispersibility-imparting group or active species having a dispersibility-imparting group can be bonded (grafted) to the surface of the pigment. Examples of the physical processing include a vacuum plasma processing. Examples of the chemical processing include a wet oxidation process in which a surface of a pigment is oxidized with an oxidant in water, and a process of bonding a carboxyl group through a phenyl group by bonding p-aminobenzoic acid to a surface of a pigment.

In the present invention, preferable examples of the self-dispersible pigments include those that are surface-treated by oxidation treatment using hypohalous acid and/or a salt of hypohalous acid, or by ozone oxidation treatment. The self-dispersible pigments are also available from commercialized products. Examples of the commercialized products include MICROJET CW-1 (trade name, produced by Orient Chemical Industries Co., Ltd.), CAB-O-JET 200, and CAB-O-JET 300 (each trade name, produced by Cabot Corporation).

The pigment used in the present invention may be used singly or in a combination of two or more kinds of pigments selected from each within-group or between groups described above.

Resin Dispersible Pigment

In addition to the above-described encapsulation method, as an example of a method of manufacturing the "pigment particles covered with water-insoluble resin" in the invention, a pigment dispersion can be manufactured by dispersing the pigment particles using a water-insoluble resin as a dispersant.

In such a way, pigment particles with a microparticulated size can be formed, and high dispersion stability after dispersion can be attained. In this case, the entire surface of the pigment particles is not necessarily covered with the water-insoluble resin, but at least a part of the pigment particles may be covered with the water-insoluble resin, as occasion demands.

The pigment dispersion can be manufactured, for example, using the phase-inversion emulsification method as described in the above. More specifically, after preparation of a fluid dispersion by mixing and dispersing the pigment, the above-described water-insoluble resin (as a dispersant), water, and a water-insoluble volatile solvent, the water-insoluble volatile solvent is removed from the resultant dispersion. At this time, a part or all of the anionic groups of the water-insoluble resin may be neutralized by adding a basic compound. An excellent dispersibility can be attained by controlling the neutralization. Examples of the basic compound include sodium hydroxide.

Further, at this time, an alkylene oxide adduct of glycerol, which will be described later, may be added together with the water-insoluble volatile solvent.

The dispersion can be performed using known methods of agitating and dispersing after mixing desired components, or using known agitating and dispersing machines. The dispersion can be performed, for example, by using a ball mill, a roll mill, a bead mill, a high-pressure homogenizer, a high-speed agitating dispersion machine and a ultrasonic homogenizer.

Dispersant for Pigment

At the time of manufacturing the pigment dispersion, the water-insoluble resin can be used as a dispersant. At this time, the other dispersant for pigment in addition to the water-insoluble resin may be used together.

The other dispersant for the pigment can be appropriately selected from the compounds having a function for dispersing pigment in an aqueous phase. Examples of dispersants for pigment include a nonionic compound, an anionic compound, a cationic compound and amphoteric compound.

For example, as dispersants, homopolymers or copolymers of monomers having an α,β-ethylenically unsaturated group and the like are exemplified. Examples of the monomers having an α,β-ethylenically unsaturated group include ethylene, propylene, butene, pentene, hexene, vinyl acetate, allyl acetate, acrylic acid, methacrylic acid, crotonic acid, crotonic acid ester, itaconic acid, itaconic acid monoester, maleic acid, maleic acid monoester, maleic acid diester, fumaric acid, fumaric acid monoester, vinyl sulfonic acid, styrene sulfonic acid, sulfonated vinyl naphthalene, vinyl alcohol, acrylamide, methacryloxy ethyl phosphate, bismethacryloxyethyl phosphate, methacryloxyethylphenyl acid phosphate, ethyleneglycol dimethacrylate, diethyleneglycol dimethacrylate, styrene, styrene derivatives such as α-methyl styrene, vinyltoluene; vinyl cyclohexane, vinyl naphthalene, vinyl naphthalene derivatives, an alkyl acrylate which may have an aromatic substituent, a phenyl acrylate, an alkyl methacrylate which may have an aromatic substituent, a phenyl methacrylate, a cycloalkyl methacrylate, an alkyl crotonate, a dialkyl itaconate, a dialkyl maleate, vinyl alcohol, and derivatives of the above compounds.

Homopolymers or copolymers of monomers having the α,β-ethylenically unsaturated group may be used as a polymer dispersant.

Examples of the polymer dispersants include an alkyl acrylate-acrylic acid copolymer, an alkyl methacrylate-methacrylic acid copolymer, a styrene-alkyl acrylate-acrylic acid copolymer, styrene-phenylmethacrylate-methacrylic acid copolymer, styrene-cyclohexyl methacrylate-methacrylic acid copolymer, styrene-styrene sulfonic acid copolymer, styrene-maleic acid copolymer, styrene-methacrylic acid copolymer, styrene-acrylic acid copolymer, vinyl naphthalene-maleic acid copolymer, vinyl naphthalene-methacrylic acid copolymer, vinyl naphthalene-acrylic acid copolymer, polystyrene, polyester and polyvinyl alcohol.

Water-Insoluble Volatile Solvent

When the pigment dispersion is prepared, at least one water-insoluble volatile solvent may be used. Since the water-insoluble volatile solvent has less influence on the dispersibility, the water-insoluble volatile solvent can be removed finally, while maintaining a good dispersibility in the dispersion step, so that the dispersion can be thickened while maintaining a good dispersed state, and the pigment dispersion with an excellent storability over a long period of time can be obtained. Moreover, when an ink composition is prepared and used for recording, an image recording with a high ink ejection stability and suppressed curl of a recording medium can be attained.

The term "water-insolubility" refers to the characteristic such that when a solvent is mixed with pure water in the same amount of the solvent, and the mixture is gently stirred at one atmospheric pressure and 20° C., the mixture does not appear to be homogeneous, even after the flow due to stirring is ceased. The solubility with respect to water at 20° C. is preferably 80 g/100 ml or less, and more preferably 50 g/100 ml or less.

The "volatility" of a solvent means that the solvent has a boiling point of 200° C. or less, and preferably 150° C. or less.

The water-insoluble volatile solvent may be appropriately selected from organic solvents with water-insolubility and volatility. Specific examples of the water-insoluble volatile solvents include ketone-based solvents (for example, methyl ethyl ketone, diethyl ketone and the like), and ether-based solvents (for example, dibutyl ether and the like). In particular, from the viewpoint of the dispersion stability, ketone-based solvents are preferable, and methyl ethyl ketone is particularly preferable.

The use amount of the water-insoluble volatile solvent is preferably from 10% by mass to 1,000% by mass, more preferably from 50% by mass to 800% by mass, and still more preferably from 100% by mass to 500% by mass with respect to the use amount of the alkyleneoxide adduct of glycerol, in view of good dispersibility and stability after dispersion, and the ink ejection stability when the water-insoluble volatile solvent is used for an ink composition for recording, and suppression of curl of a recorded medium.

The water-insoluble volatile solvent as described in the above is preferably removed from the liquid after the pigment is dispersed. In such a way, the amount of the water-insoluble volatile solvent which becomes unnecessary finally is reduced, and a thickened pigment dispersion can be obtained, while the dispersibility of pigment and storability of the dispersion can be maintained over a long period of time. Further, when the water-insoluble volatile solvent is used for preparation of pigment ink, and the ink is used for recording an image, the ink ejection stability can be attained, and occurrence of curl of a recording medium can be prevented.

The removal of the water-insoluble volatile solvent can be performed by conventional methods including a drying method such as heating or air blowing, or distillation under reduced pressure, and the water-insoluble volatile solvent is distilled away from the dispersion obtained by the dispersion process, so that the dispersion is thickened and phase-inverted to an aqueous system. In this case, when the water-insoluble resin is used as a dispersant for pigment, a dispersion of pigment particles, in which the surface of the pigment particles is covered with the water-insoluble resin, can be obtained.

It is preferable that, after the removal process of the water-insoluble volatile solvent, the water-insoluble volatile solvent is substantially removed from the prepared pigment dispersion. Specifically, the remaining amount of the water-insoluble volatile solvent in the pigment dispersion is preferably 5% by mass or less with respect to the addition amount of the water-insoluble volatile solvent at the time of dispersing, from the viewpoint of the thickening of the pigment dispersion, the ejection stability when an ink composition using the water-insoluble volatile solvent is used, and the suppression of occurrence of curl of a recording medium. The remaining amount of the water-insoluble volatile solvent in the pigment dispersion is preferably 1% by mass or less, and more preferably 0.1% by mass or less.

The average particle diameter of pigment particles dispersed in the pigment dispersion is preferably in the range of from 30 nm to 200 nm, and more preferably in the range of from 50 nm to 150 nm. When the average particle diameter of pigment particles is 30 nm or more, the production suitability is improved, and when the average particle diameter of pigment particles is 200 nm or less, the storability of the dispersion becomes good. The size distribution of the pigment particles covered with resin is not specifically restricted, and either particles having a broad particle diameter distribution or particles having a mono-dispersed particle diameter distribution may be used.

Further, the average particle diameter and of the particle size distribution of pigment particles can be obtained by measuring the volume average particle diameter by a dynamic light scattering method using NANOTRAC particle size distribution measuring device UPA-EX150 (trade name, manufactured by Nikkiso Co., Ltd.).

Although the content of the "pigment covered with water-insoluble resin" in the ink composition of the present invention is not specifically restricted, the content is preferably from 0.05% by mass to 30% by mass, more preferably from 0.1% by mass to 20% by mass, and particularly preferably from 0.15% by mass to 15% by mass. When the content is 0.05% by mass or more, the phenomena that ink coloration (coloring properties) becomes insufficient can be effectively prevented. Further, when the content is 30% by mass or less, an increase in the viscosity of ink can be effectively suppressed and deterioration of the ink ejection stability and the like can be effectively prevented.

Polymer Particles

The ink composition used in the present invention contains at least one kind of polymer particles.

The polymer particles are used preferably as polymer latex in which the particles are dispersed in water.

The polymer particles are not particularly limited. Examples of polymer particles include polymer particles composed of a resin, such as a thermoplastic resin, for example, an acrylic resin, an epoxy resin, a polyurethane resin, a polyether resin, polyamide resin, an unsaturated polyester resin, a phenol resin, a silicone resin, or a fluorine resin; polyvinyl-based resins, for example, a vinyl chloride-based resin, a vinyl acetate-based resin, polyvinyl alcohol, or polyvinyl butyral; polyester resins, for example, an alkyd resin, or a phthalic acid resin; or a copolymer or a mixture of these resins.

The polymer particles preferably have a function that increases viscosity of an ink as a result of aggregation or destabilization of the dispersion coursed by the contact of the polymer particles with a reaction liquid capable of forming aggregates by the contact with the ink composition described below, or with a region of a paper on which the reaction liquid is dried, whereby the ink composition, namely image is solidified. These polymer particles are preferably those dispersed in at least one of water or organic solvents.

From the viewpoint of the stability of an ink composition, the weight average molecular weight of the polymer particles used in the present invention is preferably from 10,000 to 200,000, and more preferably from 100,000 to 200,000.

The average particle diameter of the polymer particles used in the present invention is preferably from 10 nm to 1 μm, more preferably from 10 nm to 200 nm, further more preferably from 20 nm to 100 nm and particularly preferably from 20 nm to 50 nm.

The size distribution of the polymer particles is not specifically restricted, and either particles having a broad particle diameter distribution or particles having a mono-dispersed particle diameter distribution may be used. Further, two or more kinds of latexes each having mono-disperse particle distribution may be used.

The glass transition temperature (Tg) of the polymer particles used in the present invention is preferably 50° C. or more. Incorporation of the polymer particles having a Tg of 50° C. or more makes it possible to effectively increase fixing property of the ink composition on a recording medium and rubbing resistance. The Tg of the polymer particles is more preferably from 50° C. to 180° C., and further more preferably from 70° C. to 170° C.

Tg of the polymer particles can be properly controlled by an ordinarily used method. For example, Tg of the polymer particles can be properly controlled in a desired range by properly selecting the kind of a polymerizable group of a polymer-constituting monomer, the kind of a substituent on the monomer, its component ratio, a molecular weight of a polymer molecule constituting the polymer particle, or the like.

Tg applies a measured Tg that is obtained by an actual measurement. Specifically, the measured Tg refers to a value measured under the ordinary conditions of measurement using a differential scanning calorimeter (DSC) EXSTAR 6220 (trade name, manufactured by SII NanoTechnology Inc.). However, in the case of difficulty of measuring Tg due to decomposition of resins or the like, Tg applies a calculated Tg that is calculated using the following calculating formula. Namely, the calculated Tg is calculated according to the following formula (1).

$$1/Tg = \Sigma(X_i/Tg_i) \quad (1)$$

Herein, the polymer as an object of calculation is assumed that n kinds (i is from 1 to n) of monomer components are copolymerized. $X_i$ is a weight fraction of the $i^{th}$ monomer ($\Sigma X_i = 1$). $Tg_i$ is a glass transition temperature (absolute temperature) of a homopolymer derived from the $i^{th}$ monomer. $\Sigma$ represents the sum of values obtained respectively when i is from 1 to n. The value of glass transition temperature ($Tg_i$) of a homopolymer derived from each monomer applies the value described in Polymer Handbook ($3^{rd}$ Edition) authored by J. Brundrup and E. H. Immergut (Wiley-Interscience, 1989).

In the ink composition used in the present invention, from the viewpoints of enhancing rubbing resistance, blocking resistance, and offset resistance, the content of polymer particles (resin solid content by mass) is preferably more than the content of pigment (pigment solid content by mass). The solid content ratio by mass (a)/(b) of polymer particles (a) to pigment (b) is preferably from 1 to 10, and more preferably from 1.2 to 5.

Self-Dispersible Polymer Particles

The polymer particles used in the present invention is preferably a self-dispersible polymer particles, and more preferably a self-dispersible polymer particles having a carboxyl group, from the viewpoints of ejection stability, liquid stability (particularly dispersion stability) when the pigment described above is used, and further in consideration of imparting high-speed-ink-droplet-ejecting printability.

The "self-dispersible polymer particles" refer to particles of a water-insoluble polymer (hereinafter, may be referred to as "a first polymer") that can be in a dispersion state in an aqueous medium in the absence of another surfactant by a functional group (particularly an acidic group or a salt thereof) contained in the polymer and that does not contain a free emulsifier.

The "dispersion state" can be either an emulsion state, in which the water-insoluble polymer is dispersed as a liquid in an aqueous medium, or a suspension state, in which the water-insoluble polymer is dispersed as a solid in an aqueous medium.

From the viewpoint of the aggregation rate and the fixing property when the water-insoluble polymer is employed to form the ink composition, the water-insoluble polymer used in the invention is preferably one that can be in the suspension state, in which the water-insoluble polymer is dispersed as a solid in an aqueous medium.

The "dispersion state" of the self-dispersible polymer particles used in the invention refers to a state in which a self-dispersible polymer particles can be visually confirmed as being in a stable dispersion state at 25° C. over at least one week, even after the self-dispersible polymer particle dispersion has been prepared by mixing and stirring, by using a stirrer having a stirring blade with number of rotations of 200 rpm for 30 minutes at 25° C., a mixture solution of a solution containing 30 g of the water-insoluble polymer dissolved in 70 g of organic solvent such as methyl ethyl ketone, a neutralizer which can neutralize all salt-forming groups of the water-insoluble polymer, and 200 g of water, and then removing the organic solvent from the mixture solution, wherein the neutralizer is either sodium hydroxide when the salt-forming group is anionic, or acetic acid when the salt-forming group is cationic.

The "water-insoluble polymer" refers to a polymer whose dissolved amount to 100 g of water at 25° C. is 10 g or lower when the polymer is dried at 105° C. for 2 hours and then dissolved in the water. The dissolved amount is preferably 5 g or lower, and more preferably 1 g or lower. The "dissolved amount" is an amount of (a part of) the water-insoluble polymer dissolved in a solvent (water) when the water-insoluble polymer is completely neutralized with sodium hydroxide or acetic acid, wherein the selection from the sodium hydroxide and the acetic acid accords to the type of the salt-forming group of the water-insoluble polymer.

The aqueous medium contains water and may further contain a hydrophilic organic solvent as required. In preferable embodiments, the aqueous medium contains water and a hydrophilic organic solvent, an amount of the hydrophilic organic solvent being in a range of 0.2% by mass or less with respect to water, and in more preferable embodiments, the aqueous medium is substantially water.

There is no limitation on the main chain skeleton of the water-insoluble polymer. Examples of the polymer include a vinyl polymer and a condensed polymer (e.g., an epoxy resin, polyester, polyurethane, polyamide, cellulose, polyether, polyurea, polyimide, and polycarbonate). Among the above, a vinyl polymer is particularly preferable.

Preferable examples of a vinyl polymer and a monomer which configures the vinyl polymer include substances disclosed in JP-A Nos. 2001-181549 and 2002-88294. Moreover, a vinyl polymer in which a dissociative group has been introduced into a terminal of a polymer chain by radical polymerization of a vinyl monomer using either chain transfer agent or polymerization initiator having a dissociative group (or a substituent that can be converted to a dissociative group) or an iniferter or by ion polymerization using a compound having a dissociative group (or a substituent that can beconverted to a dissociative group) in either an initiator or a stopper also can be used.

Preferable examples of a condensed polymer and a monomer which configures the condensed polymer include substances described in JP-A No. 2001-247787.

The self-dispersing polymer particles used in the present invention preferably includes a water-insoluble polymer containing a hydrophilic structural unit and a structural unit derived from an aromatic group-containing monomer or a cycloaliphatic group-containing monomer as a hydrophobic structural unit from the viewpoint of self-dispersibility. The hydrophobic structural unit is preferably a cycloaliphatic group-containing (meth)acrylate (hereinafter, may be referred to as "an alicyclic(meth)acrylate") from the viewpoint of blocking resistance, rubbing resistance, and dispersion stability.

The alicyclic(meth)acrylate has a structure containing a structural unit derived from (meth)acrylic acid and a structural unit derived from alcohol, the structural unit derived from alcohol containing at least one alicyclic hydrocarbon group (cycloaliphatic group) which may be non-substituted or substituted. The alicyclic hydrocarbon group may be a structural unit itself derived from alcohol, or may be bonded to a structural portion derived from alcohol through a connecting group.

The "alicyclic(meth)acrylate" refers to methacrylate or acrylate having an alicyclic hydrocarbon group.

There is no limitation on the hydrophilic structural unit insofar as it is derived from a hydrophilic group-containing monomer, and may be derived from one hydrophilic group-containing monomer or may be derived from two or more hydrophilic group-containing monomers. The hydrophilic group is not limited and may be a dissociative group or a nonionic hydrophilic group.

The hydrophilic group is preferably a dissociative group, and more preferably an anionic dissociative group, from the viewpoints of promoting the self-dispersibility and improving stability of the emulsion state or dispersion state of the self-dispersible polymer particles. Examples of the dissociative group include a carboxyl group, a phosphoric acid group, and a sulfonic acid group. Among the above, the carboxyl group is preferable from the viewpoint of fixing property when the ink composition is formed therewith.

The hydrophilic group-containing monomer used in the present invention is preferably a dissociative group-containing monomer from the viewpoints of self-dispersibility and aggregation properties, and specifically, the hydrophilic group-containing monomer is preferably a dissociative group-containing monomer having a dissociative group and an ethylenically unsaturated bond.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl(meth)acrylate, and bis-(3-sulfopropyl)-itaconate. Specific examples of the unsaturated phosphoric acid monomer include vinyl phosphoric acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, from the viewpoint of dispersion stability and ejection stability, the unsaturated carboxylic acid monomer is preferable, and acrylic acid and methacrylic acid are more preferable.

In preferable embodiments, the self-dispersible polymer particles employed in the invention contain a first polymer having a carboxyl group and an acid value (mgKOH/g) of 25 to 100 from the viewpoints of improving self-dispersibility and an aggregation rate when the ink composition contacts a reaction liquid. In more preferable embodiments, the acid value is from 25 to 80, and in particularly preferable embodiments, the acid value is from 30 to 65, from the viewpoints of improving self-dispersibility and an aggregation rate when the ink composition contacts a reaction liquid.

Stability of the dispersion state of the self-dispersible polymer particles can be favorable when the acid value is 25 or more, and the aggregation properties can be improved when the acid value is 100 or lower. Further, the acid value of the self-dispersible polymer particles is preferably less than that of the above-described water-insoluble polymer (a second polymer) from the viewpoints of improving dispersion stability of a pigment in combination with an aggregation rate when the ink composition contacts a reaction liquid. A difference in the acid value between a second polymer and a first polymer is preferably from 5 to 70, and more preferably from 10 to 70.

There is no limitation on the aromatic group-containing monomer insofar as it is a compound containing an aromatic group and a polymerizable group. The aromatic group may be a group derived from an aromatic hydrocarbon or a group derived from an aromatic heterocyclic ring. In the present invention, the aromatic group is preferably an aromatic group derived from an aromatic hydrocarbon from the viewpoint of particle shape stability in an aqueous medium.

The polymerizable group may be a condensation polymerizable group or an addition polymerizable group. In the present invention, from the viewpoint of particle shape stability of the self-dispersible polymer particles in the aqueous medium, the polymerizable group preferably an addition polymerizable group, and more preferably a group containing an ethylenically unsaturated bond.

The aromatic group-containing monomer used in the present invention is preferably a monomer having an ethylenically unsaturated bond and an aromatic group derived from aromatic hydrocarbon, and more preferably an aromatic group-containing (meth)acrylate monomer. The aromatic group-containing monomers may be used singly or in combination of two or more.

Examples of the aromatic group-containing monomer include phenoxyethyl(meth)acrylate, benzyl(meth)acrylate, phenyl(meth)acrylate, and a styrene monomer. From the viewpoints of well-balancing hydrophilicity and hydrophobicity of the polymer chain of the self-dispersible polymer particles and ink fixing property, the aromatic group-containing monomer is preferably at least one selected from the group consisting of phenoxyethyl(meth)acrylate, benzyl (meth)acrylate, and phenyl(meth)acrylate, more preferably phenoxyethyl(meth)acrylate, and phenoxyethylacrylate is especially preferable.

The "(meth)acrylate" refers to acrylate or methacrylate.

The alicyclic hydrocarbon group is not particularly limited, so long as the group contains a cyclic non-aromatic hydrocarbon group. Examples of the alicyclic hydrocarbon group include a monocyclic hydrocarbon group, a dicyclic hydrocarbon group, and a tricyclic or more polycyclic hydrocarbon group. Specific examples of the alicyclic hydrocarbon group include a cycloalkyl group such as a cyclopentyl group, or a cyclohexyl group; a cycloalkenyl group; a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[$5.2.1.0^{2,6}$]decanyl group, and bicycle[4.3.0]nonane.

Further, the alicyclic hydrocarbon group may have a substituent. Examples of the substituent include an alkyl group, an alkenyl group, an aryl group, an aralkyl group, an alkoxy group, a hydroxyl group, a primary amino group, a secondary amino group, a tertiary amino group, an alkyl carbonyl group, an aryl carbonyl group, and a cyano group. Further, the alicyclic hydrocarbon group may form a condensed ring. As for the alicyclic hydrocarbon group used in the present invention, it is preferred from the viewpoints of viscosity and resolvability that an alicyclic hydrocarbon moiety thereof has 5 to 20 carbon atoms.

Preferable examples of the linking group that bonds an alicyclic hydrocarbon group and a structural unit derived from alcohol include an alkyl group, an alkenyl group, an alkylene group, an aralkyl group, an alkoxy group, a mono or oligo ethylene glycol group, a mono or oligo propylene glycol group, each of which has 1 to 20 carbon atoms.

Specific examples of the alicyclic (meth)acrylate in the present invention are shown below. However, the present invention is not limited to these compounds.

Examples of monocyclic(meth)acrylates include cycloalkyl(meth)acrylates of which a cycloalkyl moiety has 3 to 10 carbon atoms, such as cyclopropyl(meth)acrylate, cyclobutyl(meth)acrylate, cyclopentyl(meth)acrylate, cyclohexyl(meth)acrylate, cycloheptyl(meth)acrylate, cyclooctyl (meth)acrylate, cyclononyl(meth)acrylate, or cyclodecyl (meth)acrylate.

Examples of dicyclic(meth)acrylates include isobornyl (meth)acrylate, and norbornyl(meth)acrylate.

Examples of tricyclic(meth)acrylates include adamantyl (meth)acrylate, dicyclopentanyl(meth)acrylate, and dicyclopentenyloxyethyl(meth)acrylate.

These alicyclic(meth)acrylates may be used singly or as a mixture of two or more kinds Of these alicyclic(meth)acrylates, at least one of dicyclic (meth)acrylates or tricyclic or more polycyclic(meth)acrylates is preferable from the viewpoints of dispersion stability of self-dispersible polymer particles, fixing properties, and blocking resistance. Further, at least one of isobornyl(meth) acrylate, adamantyl(meth)acrylate, or dicyclopentanyl(meth) acrylate is more preferable from the same reasons as described above.

The self-dispersible polymer particles used in the present invention is preferably a acrylic resin containing a structural unit derived from a (meth)acrylate monomer, more preferably a acrylic resin containing a structural unit derived from an aromatic group-containing (meth)acrylate or an alicyclic (meth)acrylate, and further preferably a acrylic resin containing a structural unit derived from an aromatic group-containing (meth)acrylate or an alicyclic(meth)acrylate, the content of which being from 10% by mass to 95% by mass. When the content of the aromatic group-containing (meth)acrylate or an alicyclic(meth)acrylate is from 10% by mass to 95% by mass, self-emulsifying property or stability of the dispersion state is improved, and moreover an increase in ink viscosity can be suppressed.

In the present invention, the content of the aromatic group-containing (meth)acrylate or an alicyclic(meth)acrylate is more preferably from 15% by mass to 90% by mass, further preferably from 15% by mass to 80% by mass, and particularly preferably from 25% by mass to 70% by mass, from the viewpoints of improvement in stability of self-dispersion state, stabilization of the particle shape in an aqueous medium due to hydrophobic interaction between aromatic rings or between alicyclic groups, and reduction in the amount of water-soluble components due to appropriate hydrophobization of particles.

The self-dispersible polymer particles used in the invention can be formed by using, for example, a structural unit derived from an aromatic group-containing monomer or an cyclic aliphatic group-containing monomer and a structural unit derived from a dissociative group-containing monomer. The self-dispersible polymer particles may further contain other structural units as needed.

While there is no limitation on a monomer which forms the other structural unit insofar as it can be copolymerized with the aromatic group-containing monomer or the cyclic aliphatic group-containing monomer and the dissociative group-containing monomer, from the viewpoint of flexibility of the main chain skeleton of the water-insoluble polymer or ease of regulation of glass transition temperature (Tg), an alkyl group-containing monomer is preferable.

Examples of the alkyl group-containing monomer include (meth)acrylate monomers and (meth)acrylaide monomers. Examples of the (meth)acrylate monomers include alkyl (meth)acrylates, such as methyl(meth)acrylate, ethyl(meth) acrylate, isopropyl(meth)acrylate, n-propyl(meth)acrylate, n-butyl(meth)acrylate, isobutyl(meth)acrylate, t-butyl(meth) acrylate, hexyl(meth)acrylate, or ethylhexyl(meth)acrylate; ethylenically unsaturated monomers having a hydroxyl group, such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, or hydroxyhexyl(meth)acrylate; and dialkylamino alkyl(meth) acrylates, such as dimethylaminoethyl(meth)acrylate. Examples of the (meth)acrylamide monomers include N-hydroxyalkyl(meth)acrylamides, such as N-hydroxymethyl (meth)acrylamide, N-hydroxyethyl(meth)acrylamide, or N-hydroxybutyl(meth)acrylamide; and N-alkoxyalkyl(meth) acrylamides, such as N-methoxymethyl(meth)acrylamide, N-ethoxymethyl(meth)acrylamide, N-(n-,iso)butoxymethyl (meth)acrylamide, N-methoxyethyl(meth)acrylamide, N-ethoxyethyl(meth)acrylamide, or N-(n-,iso)butoxyethyl (meth)acrylamide.

The molecular weight range of the water-insoluble polymer which configures the self-dispersible polymer particles used in the present invention is, in terms of weight average molecular weight, preferably from 3,000 to 200,000, more preferably from 5,000 to 150,000, and still more preferably from 10,000 to 100,000. By adjusting the weight average molecular weight to 3,000 or more, the content of water-soluble components can be effectively reduced. By adjusting the weight average molecular weight to 200,000 or less, stability of self-dispersibility can be increased.

The weight average molecular weight can be measured by gel permeation chromatography (GPC). GPC may be conducted using HLC-8020GPC (trade name, manufactured by Tosoh Corporation), three columns of TSK gel Super HZM-H, TSK gel Super HZ 4000 and TSK gel Super HZ 2000 (each trade names, manufactured by Tosoh Corporation, 4.6 mm ID×15 cm), and THF (tetrahydrofuran) as an eluate.

From the viewpoint of regulation of hydrophilicity and hydrophobicity of a polymer, the water-insoluble polymer which configures the self-dispersible polymer particles used in the invention preferably contains a structural unit derived from the aromatic group-containing (meth)acrylate or the alicyclic(meth)acrylate (preferably a structural unit derived from phenoxyethyl(meth)acrylate and/or a structural unit derived from benzyl(meth)acrylate, alternatively a structural unit derived from isobornyl(meth)acrylate and/or adamantyl (meth)acrylate and/or dicyclopentanyl(meth)acrylate), wherein the content (copolymerization ratio) of the structural unit derived from the aromatic group-containing (meth)acrylate or the alicyclic(meth)acrylate is preferably from 15% by mass to 80% by mass with respect to the total amount of self-dispersible polymer particles.

From the viewpoint of regulation of hydrophilicity and hydrophobicity of a polymer, in preferable embodiments, the water-insoluble polymer preferably contains a structural unit derived from the aromatic group-containing (meth)acrylate monomer or the alicyclic(meth)acrylate, and moreover a structural unit derived from a carboxyl group-containing monomer, and a structural unit derived from an alkyl group-containing monomer (preferably a structural unit derived from alkyl ester of (meth)acrylic acid wherein the content (copolymerization ratio) of the structural unit derived from the aromatic group-containing (meth)acrylate monomer or the alicyclic(meth)acrylate is preferably from 15% by mass to 80% by mass with respect to the total amount of self-dispersible polymer particles. In more preferable embodiments, the water-insoluble polymer contains a structural unit derived from phenoxyethyl(meth)acrylate and/or a structural unit derived from benzyl(meth)acrylate, or a structural unit derived from isobornyl(meth)acrylate and/or adamantyl (meth)acrylate and/or dicyclopentanyl(meth)acrylate, and moreover a structural unit derived from a carboxyl group-containing monomer, and a structural unit derived from an alkyl group-containing monomer (preferably a structural unit derived from alkyl ester of (meth)acrylic acid, the alkyl moiety having 1 to 4 carbon atoms), wherein the content (copolymerization ratio) of the structural unit derived from phenoxyethyl(meth)acrylate and/or the structural unit derived from benzyl(meth)acrylate, or the structural unit derived from isobornyl(meth)acrylate and/or adamantyl(meth)acrylate and/or dicyclopentanyl(meth)acrylate is from 15% by mass to 80% by mass with respect to the total amount of self-dispersible polymer particles. In addition, the water-insoluble polymer preferably has the acid value of from 25 to 100 and the weight average molecular weight of from 3,000 to 200,000, and more preferably has the acid value of from 25 to 95 and the weight average molecular weight of 5,000 to 150,000.

Hereinafter, exemplary compounds B-01 to B-19 and C-01 to C-05 are shown as specific examples of the water-insoluble polymer which configures the self-dispersible polymer particles, although the invention is not limited thereto. The ratio in brackets represents the mass ratio of copolymerization components.

B-01: Phenoxyethyl acrylate/Methyl methacrylate/Acrylic acid copolymer (50/45/5)

B-02: Phenoxyethyl acrylate/Benzyl methacrylate/Isobutyl methacrylate/Methacrylic acid copolymer (30/35/29/6)

B-03: Phenoxyethyl methacrylate/Isobutyl methacrylate/Methacrylic acid copolymer (50/44/6)

B-04: Phenoxyethyl acrylate/Methyl methacrylate/Ethylacrylate/Acrylic acid Copolymer (30/55/10/5)

B-05: Benzyl methacrylate/Isobutyl methacrylate/Methacrylic acid copolymer (35/59/6)

B-06: Styrene/Phenoxyethyl acrylate/Methyl methacrylate/Acrylic acid copolymer (10/50/35/5)

B-07: Benzyl acrylate/Methyl methacrylate/Acrylic acid copolymer (55/40/5)

B-08: Phenoxyethyl methacrylate/Benzyl acrylate/Methacrylic acid copolymer (45/47/8)

B-09: Styrene/Phenoxyethyl acrylate/Butyl methacrylate/Acrylic acid copolymer (5/48/40/7)

B-10: Benzyl methacrylate/Isobutyl methacrylate/Cyclohexyl methacrylate/Methacrylic acid copolymer (35/30/30/5)

B-11: Phenoxyethyl acrylate/Methyl methacrylate/Butyl acrylate/Methacrylic acid copolymer (12/50/30/8)

B-12: Benzyl acrylate/Isobutyl methacrylate/Acrylic acid copolymer (93/2/5)

B-13: Styrene/Phenoxyethyl methacrylate/Butyl acrylate/Acrylic acid copolymer (50/5/20/25)

B-14: Styrene/Butyl acrylate/Acrylic acid copolymer (62/35/3)

B-15: Methyl methacrylate/Phenoxyethyl acrylate/Acrylic acid copolymer (45/51/4)

B-16: Methyl methacrylate/Phenoxyethyl acrylate/Acrylic acid copolymer (45/49/6)

B-17: Methylmethacrylate/Phenoxyethyl acrylate/Acrylic acid copolymer (45/48/7)

B-18: Methyl methacrylate/Phenoxyethyl acrylate/Acrylic acid copolymer (45/47/8)

B-19: Methylmethacrylate/Phenoxyethyl acrylate/Acrylic acid Copolymer (45/45/10)

C-01: Methyl methacrylate/Isobornyl methacrylate/Methacrylic acid copolymer (20/72/8)

C-02: Methyl methacrylate/Isobornyl methacrylate/Methacrylic acid copolymer (40/52/8)

C-04: Methyl methacrylate/Isobornyl methacrylate/Dicyclopentanyl methacrylate/Methacrylic acid copolymer (20/62/10/8)

C-05: Methyl methacrylate/Dicyclopentanyl methacrylate/Methacrylic acid copolymer (20/72/8)

There is no particular limitation on a method of producing the water-insoluble polymer which configures the self-dispersible polymer particles used in the present invention. Examples of the method include a method of performing emulsion polymerization in the presence of a polymerizable surfactant to covalently bind a surfactant and a water-insoluble polymer; and a method of copolymerizing a monomer mixture containing the above-described hydrophilic group-containing monomer and the above-described aromatic group-containing monomer by known polymerization methods such as a solution-polymerization method or a block-polymerization method. Among these polymerization methods, the solution-polymerization method is preferable, and the solution-polymerization method using an organic solvent is more preferable, from the viewpoint of an aggregation rate and droplet ejecting stability when the self-dispersible polymer particles are employed in the ink composition.

From the viewpoint of an aggregation rate, it is preferable that the self-dispersible polymer particles used in the present invention contain a first polymer, the polymer being synthesized in an organic solvent and having a carboxyl group and the acid value of 20 to 100, and the self-dispersible polymer particles being prepared as a polymer dispersion in which the carboxyl group of the first polymer is partially or thoroughly neutralized and water functions as a continuous phase.

More specifically, the method of producing the self-dispersible polymer particles used in the present invention preferably includes a process of synthesizing the first polymer in an organic solvent and a process of dispersing the first polymer to form an aqueous dispersion thereof, at least a part of the carboxyl group of the first polymer being neutralized.

The dispersing preferably includes the following processes (1) and (2).

Process (1): Stirring a mixture containing a first polymer (water-insoluble polymer), an organic solvent, a neutralizer, and an aqueous medium; and Process (2): Removing the organic solvent from the mixture.

The process (1) preferably includes obtaining a dispersion by, at first, dissolving the first polymer (water-insoluble polymer) in an organic solvent, and then gradually adding a neutralizer and an aqueous medium, and mixing and stirring the mixture. The addition of the neutralizer and the aqueous medium to a solution of the water-insoluble polymer dissolved in an organic solvent makes it possible to obtain self-dispersible polymer particles having particle diameters capable of imparting higher storage stability without strong shearing force.

There is no limitation on a stirring method of the mixture, and generally-used mixing and stirring devices or, as required, dispersers such as an ultrasonic disperser or a high voltage homogenizer can be used.

Preferable examples of the organic solvent include an alcohol solvent, a ketone solvent, and an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among these solvents, the ketone solvent such as methyl ethyl ketone or the alcohol solvent such as isopropyl alcohol is preferable. It is also preferable to use isopropyl alcohol and methyl ethyl ketone in combination so that the change in polarity at the time of phase inversion from an oil phase to a water phase can be moderated. By using the solvents in combination, self-dispersible polymer particles that can be free from aggregation-precipitation or fusion of particles and can have high dispersion stability and fine particle diameters can be obtained.

The neutralizer is used for forming an emulsion state or a dispersion state in which the dissociative group is partially or thoroughly neutralized and the self-dispersible polymer is stabilized in water. Examples of the neutralizer which can be used when the self-dispersible polymer employed in the invention has an anionic dissociative group (e.g., a carboxyl group) as the dissociative group include basic compounds such as organic amine compounds, ammonia, or hydroxides of alkali metals. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and tri-isopropanolamine. Examples of the hydroxides of alkali metals include lithium hydroxide, sodium hydroxide, and potassium hydroxide. Among the above, from the viewpoint of stabilization of dispersion of the self-dispersible polymer particles employed in the invention in water, sodium hydroxide, potassium hydroxide, triethylamine, and triethanolamine are preferable.

The content of the basic compound is preferably from 5 to 120% by mol, more preferably from 10 to 110% by mol, and still more preferably from 15 to 100% by mol, with respect to 100% by mol of the dissociative groups. Stabilization of the dispersion of the particles in water can be further demonstrated when the content of the basic compound is adjusted to 15% by mol or more. Reduction in content of the water-soluble components can be effected when the content of the basic compound is adjusted to 100% by mol or less.

In the process (2), an aqueous dispersion of the self-dispersible polymer particles can be obtained by inverting a phase of the dispersion, which has been obtained in the process (1), to a water phase as a result of distilling off the organic solvent from the dispersion by a common procedure such as vacuum distillation. The thus-obtained aqueous dispersion is substantially free of the organic solvent. Specifically, the amount of the organic solvent contained in the aqueous dispersion is preferably 0.2% by mass or less, and more preferably 0.1% by mass or less.

The average particle diameter of the self-dispersible polymer particles is preferably in the range of 10 nm to 400 nm, more preferably in the range of 10 nm to 200 nm, and still more preferably in the range of 10 nm to 100 nm. When the average particle diameter is 10 nm or more, production suitability of the polymer particles may be increased. When the average particle diameter is 400 nm or less, the storage stability may be increased. The particle size distribution of the self-dispersible polymer particles is not particularly limited. The polymer particles may have either a broad particle size distribution or a monodisperse particle size distribution. Two or more water-insoluble particles may be used in combination as a mixture.

The average particle diameter and particle size distribution of the polymer particles can be determined by a light scattering method.

The self-dispersible polymer particles used in the present invention can be favorably contained in, for example, in a water-based ink composition and may be used solely or in combination of two or more kinds Solid Wetting Agent The ink composition used in the present invention may contain a solid wetting agent.

The solid wetting agent used in the present invention refers to a water-soluble compound that has a water-retaining function, and that is solid at 25° C. The solid wetting agent has high water-retaining function whereby an ink can be prevented from dryness and solidification which are not desirable for the ink. As a result, in the present invention, the solid wetting agent can be favorably used in the ink composition.

As the solid wetting agent usable in the invention, compounds commonly used for water-based ink compositions can be used without any modification, and, more specifically, urea, and urea derivatives, sugars, and polyhydric alcohols such as sugar alcohols, hyaluronic acids, trimethylol propane or 1,2,6-hexanetriol are exemplified.

Examples of the urea derivatives include compounds in which the hydrogen atom on the nitrogen of urea is substituted with an alkyl group or an alkanol, thiourea, or compounds in which the hydrogen atom on the nitrogen of thiourea is substituted with an alkyl group or an alkanol. More specifically, N, N-dimethyl urea, thiourea, ethyleneurea, hydroxyethyl urea, hydroxybutyl urea, ethylene thiourea, diethyl thiourea, and the like are exemplified.

Examples of the sugars include monosaccharide, disaccharide, oligosaccharides (including trisaccharides and tetraaccharides) and polysaccharides, specifically, glucose, mannose, fructose, ribose, xylose, arabinose, galactose, aldonic acid, glucitol, (sorbit), maltose, cellobiose, lactose, sucrose, trehalose, maltotriose are exemplified. Here, polysaccharides means sugars in a broad sense, and, are used for including substances such as alginic acid, α-cyclodextrin, or cellulose, which are widely distributed in nature. Further, derivatives of these sugars include reduced sugars of the above-described sugars (for example, sugar alcohol), and oxidized sugars (sugar acids) (for example, aldonic acid, uronic acid, amino acid, thiosugar, and the like). In particular, sugar alcohol is desirable, and specifically, maltitol, sorbitol, xylitol, and the like are exemplified. As hyaluronate, commercially available sodium hyaluronate (1% aqueous solution) (molecular weight 350,000) may be used.

The content of the solid wetting agent in the ink composition used in the present invention is preferably from 1.0% by mass to less than 20.0% by mass, more preferably from 2.0% by mass to less than 15.0% by mass, and still more preferably from 3.0% by mass to less than 10.0% by mass, from the viewpoint of further increasing the wiping off property.

Herein, when the ink composition used in the present invention contains two or more solid wetting agents, it is preferred that the total content of these two or more solid wetting agents is in the above range.

Water-Soluble Organic Solvent

The ink composition used in the invention contains water as a solvent and preferably contains at least one kind of water-soluble organic solvents.

Examples of the water-soluble organic solvents include glycerol, 1,2,6-hexanetriol, trimethylol propane, alkanediols (polyhydric alcohols) such as ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; alkyl alcohols having 1-4 carbon atoms, such as ethanol, methanol, butanol, propanol or isopropanol; glycol ethers such as ethyleneglycol monomethylether, ethyleneglycol monoethylether, ethyleneglycol monobutylether, ethyleneglycol monomethylether acetate, diethyleneglycol monomethylether, diethyleneglycol monoethylether, diethylene glycol mono-n-propylether, ethyleneglycol mono-iso-propylether, diethylene glycol mono-iso-propylether, ethyleneglycol mono-n-butylether, ethyleneglycol mono-t-butylether, diethyleneglycol mono-t-butylether, 1-methyl-1-methoxybutanol, propyleneglycol monomethylether, propyleneglycol monoethylether, propyleneglycol mono-t-butylether, propyleneglycol mono-n-propylether, propyleneglycol mono-iso-propylether, dipropyleneglycol monomethylether, dipropyleneglycol monoethylether, dipropyleneglycol mono-n-propylether or dipropyleneglycol mono-iso-propylether; 2-pyrrolidone, N-methyl-2-pyrrolidone, 1,3-dimethyl-2-imidazolizinone, formamide, acetamide, dimethylsulfoxide, sorbit, sorbitan, acetin, diacetin, triacetin or sulfolane. These compounds may be used singly, or may be used in combination of two or more kinds thereof.

For the purpose of imparting a dryness preventive property or a wetting property, it is useful to use polyhydric alcohols. Examples of polyhydric alcohols include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol and 1,2,6-hexanetriol. These compounds may be used singly or may be used in combination of two or more kinds thereof. In view of penetrating property, it is desirable to use polyol compounds. Examples of polyol compounds include, for example, aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol or 2-ethyl 1,3-hexanediol. In particular, 2-ethyl-1,3-hexanediol or 2,2,4-trimethyl-1,3-pentanediol is preferable. These compounds may be used singly or may be used in combination of two or more kinds thereof.

Alkyleneoxide adducts of glycerol may be preferably used. As the alkyleneoxide adduct of glycerol, commercially available products may be used. Examples of the commercially available product include, as examples of polyoxy propylated glycerol (ether of polypropylene glycol and glycerol), SANNIX GP-250 (average molecular weight of 250), SANNIX GP-400 (average molecular weight of 400), and SANNIX GP-600 (average molecular weight of 600) (each trade names, manufactured by Sanyo Chemical Industries, Ltd.), LEOCON GP-250 (average molecular weight of 250), LEOCON GP-300 (average molecular weight of 300), LEOCON GP-400 (average molecular weight of 400) and LEOCON GP-700 (average molecular weight of 700) (each trade names, manufactured by Lion Corporation); and polypropylene triol glycol.triol type products having average molecular weight of 300 and average molecular weight of 700 (each manufactured by Wako Pure Chemical Industries, Ltd.)

From the viewpoint of imparting the dryness preventive property and the wetting property, the content of the water-soluble organic solvent contained in the ink composition used in the invention is preferably from 1.0% by mass to 50% by mass, more preferably from 5.0% by mass to 40% by mass, and particularly preferably from 10% by mass to 30% by mass with respect to the ink composition.

Water

Although the pigment dispersion used in the present invention contains water, the quantity of water is not particularly restricted. In particular, the content of water is preferably from 10% by mass to 99% by mass, more preferably from 30% by mass to 80% by mass, and still more preferably from 50% by mass to 70% by mass.

Other Components

The ink composition used in the present invention may contain other additives in addition to the above components. The other additives include, for example, known additives such as a surfactant, an ultraviolet absorber, an anti-fading agent, an antifungal agent, a pH adjuster, an antirust agent, an antioxidant, an emulsion stabilizer, an antiseptic agent, a defoaming agent, a viscosity adjustment agent, a dispersion stabilizer or a chelating agent.

The surfactant is used as a surface tension adjusting agent, and examples of the surfactant includes a nonionic surfactant, a cationic surfactant, an anionic surfactant and a betaine surfactant. In order to eject inkjet droplets suitably on a recording medium, the surface tension adjusting agent is added to an ink composition in such an amount that the surface tension of the ink composition used in the present invention is preferably adjusted to a range of 20 mN/m to 60 mN/m, more preferably from 20 mN/m to 45 mN/m, and still more preferably from 25 mN/m to 40 mN/m.

Although the content of the surfactant in the ink composition is not specifically restricted, the content is preferably 1% by mass or more, more preferably from 1% by mass to 10% by mass, and further more preferably from 1% by mass to 3% by mass.

Properties of Ink Composition

The surface tension of the ink composition used in the present invention is preferably adjusted to a range of from 20 mN/m to 60 mN/m, more preferably from 20 mN/m to 45 mN/m, and still more preferably from 25 mN/m to 40 mN/m, from the viewpoint of ejection stability when the ink composition is applied to inkjet recording system.

The viscosity of the ink composition used in the present invention at 20° C. is preferably from 1.2 mPa·s to 15.0 mPa·s, more preferably from 2 mPa·s to less than 13 mPa·s and still more preferably from 2.5 mPa·s to less than 10 mPa·s.

The ink composition used in the present invention may be used for formation of multi-color images (for example, full color mages). For the formation of multi-color images, the ink composition may be used as a magenta colored ink, a cyan colored ink, or a yellow colored ink by changing a color hue of the pigment used in the ink composition as requested. Further, in order to adjust a color tone, a black colored ink may be used.

Further, the ink composition used in the present invention may be used as a red (R)-, green (G)-, blue (B)-, or white (W)-colored ink, or a so-called "special color" ink in the graphic art, except for the yellow (Y)-, magenta (M)-, or cyan (C)-colored ink.

3. Aggregation Liquid

The ink set of the present invention preferably further include at least one aggregation liquid (hereinafter, may be referred to as a reaction liquid) capable of forming an aggregate when the aggregating liquid contacts the ink composition.

The aggregation liquid contains at least one aggregating agent (hereinafter, may be referred to as an aggregation accelerator) capable of forming an aggregate when the aggregating agent contacts the ink composition. Due to mixing of the ink composition and the aggregating agent on a recording medium, aggregation of pigments or the like that is stably existing as a dispersion in the ink composition is accelerated. The aggregating agent is preferably at least one of materials selected from the group consisting of a cationic polymer, an acidic compound and a polyvalent metal salt from the viewpoint of image quality to be formed.

Polymers having a primary-, secondary- or tertiary-amino group or a quaternary ammonium salt group as the cationic group can be preferably used as the cationic polymer.

Preferable examples of the cationic polymer include: polymers that are obtained as a homopolymer of a monomer (cationic monomer) having a primary-, secondary- or tertiary-amino group, salts thereof, or a quaternary ammonium salt group; and polymers that are obtained as a copolymer or a condensation polymer of the cationic monomer and other monomer (hereinafter sometimes referred to as a "non-cationic monomer"). The polymers can be used in any form of a water-soluble polymer or water dispersible latex particles.

Specifically, the cationic polymer may be selected from poly(vinylpyridine) salts, polyalkylaminoethylacrylate, polyalkylaminoethylmethacrylate, poly(vinylimidazole), polyethyleneimine, polybiguanide, polyguanide, a copolymer containing an epihalohydrin derivative and an amine derivative as polymer components, a combination of these polymers, or the like.

The aggregation liquid used in the present invention may contain a water-based solvent (e.g., water) in addition to the cationic polymer.

The content of the cationic polymer in the aggregation liquid is preferably 5% by mass to 95% by mass, and more preferably 10% by mass to 80% by mass with respect to the total amount of the aggregation liquid from the viewpoint of aggregation effects.

Examples of the aggregation liquid containing an acidic compound include a liquid that can generate an aggregate by changing the pH of the ink composition. Herein, the pH of the aggregation liquid at 25° C. is preferably 1 to 6, more preferably 2 to 5, and still more preferably 3 to 5 from the viewpoint of the aggregation rate of the ink composition. Herein, the pH of the ink composition used in the ejection process at 25° C. is preferably 7.5 or more, and more preferably 8 or more.

In particular, in preferable embodiments, the pH (25° C.) of the ink composition is 7.5 or more and the pH (25° C.) of the aggregation liquid is 3 to 5 from the viewpoint of improvements in image density and image resolution, and speed up of ink jet recording.

The components for the aggregation can be used singly or in combination of two or more kinds The aggregation liquid may be formed using at least one acidic compound as an aggregation accelerator. Examples of the acidic compound include compounds having a phosphoric acid group, a phosphonic acid group, a phosphinic acid group, a sulfuric acid group, a sulfonic acid group, a sulfinic acid group, or a carboxyl group, or salts thereof (e.g., polyvalent metal salts). Among the above, from the viewpoint of the aggregation rate of the ink composition, the compounds having a phosphoric acid group or a carboxyl group are more preferable, and the compounds having a carboxyl group are still more preferable.

The compounds having a carboxyl group are preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyronecarboxylic acid, pyrrolecarboxylic acid, furancarboxylic acid, pyridinecarboxylic acid, coumalic acid, thiophenecarboxylic acid, nicotinic acid, derivatives thereof, or salts thereof (e.g., polyvalent metal salts). These compounds may be used singly or in combination of two or more thereof.

The content of the acidic compound in the aggregation liquid is preferably from 5% by mass to 95% by mass, and more preferably from 10% by mass to 80% by mass, with respect to the total amount of the aggregation liquid from the viewpoint of the aggregation effects.

One preferable example of the aggregation liquid that improves high-speed aggregation properties include an aggregation liquid to which a polyvalent metal salt is added. Examples of the polyvalent metal salt include alkaline earth metals of the second group of the periodic table (e.g., magnesium and calcium), the transition metals of the third group of the periodic table (e.g., lanthanum), cation of the 13th group of the periodic table (e.g., aluminum), and salts of lanthanides (e.g., neodymium). Carboxylate (for example, salts of formic acid, acetic acid, or benzoic acid), nitrate, chloride, and thiocyanate are preferable as the salts of metals. Among the above, calcium salts or magnesium salts of carboxylic acid (for example, salts of formic acid, acetic acid, or benzoic acid), calcium salts or magnesium salts of nitric acid, calcium chloride, magnesium chloride, and calcium salts or magnesium salts of thiocyanic acid are preferable.

The content of the metal salt in the aggregation liquid is preferably in the range of 1% by mass to 10% by mass, more preferably in the range of 1.5% by mass to 7% by mass, and still more preferably in the range of 2% by mass to 6% by mass.

The viscosity of the aggregation liquid is preferably in the range of 1 mPa·s to 30 mPa·s, more preferably in the range of 1 mPa·s to 20 mPa·s, still more preferably in the range of 2 mPa·s to 15 mPa·s, and particularly preferably in the range of 2 mPa·s to 10 mPa·s from the viewpoint of the aggregation rate of the ink composition. The viscosity is measured under the conditions of a temperature of 20° C. using VISCOMETER TV-22 (trade name, manufactured by TOKI SANGYO CO. LTD).

The surface tension of the aggregation liquid is preferably from 20 mN/m to 60 mN/m, more preferably from 20 mN/m to 45 mN/m, and still more preferably from 25 mN/m to 40 mN/m from the viewpoint of the aggregation rate of the ink composition. The surface tension is measured under the conditions of a temperature of 25° C. using AUTOMATIC SURFACE TENSIOMETER CBVP-Z (trade name, manufactured by Kyowa Interface Science Co., LTD.).

4. Image Forming Method

The image forming method, which is one aspect of the present invention, is a method using the above-described ink set for inkjet recording, and further the method includes an ink application process of applying a water-based ink composition onto a recording medium by ejecting the ink composition from an inkjet head, and an ink removal process of removing the ink composition adhered to the inkjet head by a maintenance liquid.

Ink Application Process

Any known liquid application methods can be used without limitation in the ink application process that is performed in the present invention. Examples of the liquid application method include application of ink using a common writing material, application of ink using a pen plotter, and application of ink by an ink jet method. From the viewpoint of high-speed recordability, the application of the ink composition is preferably performed by an inkjet method.

Inkjet recording method which can be used in the present invention may include imparting energy to an inkjet recording ink (ink composition) to form an image on a known image receiving material such as plain paper, resin coated paper, inkjet paper such as those described in JP-A-Nos. 8-169172, 8-27693, 2-276670, 7-276789, 9-323475, 62-238783, 10-153989, 10-217473, 10-235995, 10-217597 or 10-337947, a film, electrophotographic common paper, fabrics, glass, metal or ceramics. In embodiments, the inkjet recording method described in the paragraphs 0093 to 0105 of JP-A No. 2003-306623 can be used as a preferable inkjet recording method in the present invention.

As the inkjet head (hereinafter simply referred to as "head" in sometimes), a known ink jet head may be used. Either a continuous type head or a dot-on-demand type head can be used. Of dot-on-demand type heads, a head having an operation valve at a thermal head for ejection, such as that disclosed in JP-A No. 9-323420 is preferable. Examples of piezo heads include those described in European Patent Application Publication Nos. 0277703 A1 and 0278590 A1. It is preferable that the head has a temperature adjustment function so that the temperature of the ink may be controlled. In the ink ejection process, it is preferable to control the temperature of the ink so that a deviation of the ink viscosity is within ±5%. It is preferable that operation is performed at a drive frequency from 1 kHz to 500 kHz. It is not necessary for the shape of the nozzle to be circular, and any shape, such as an elliptical or square shape, may be used. It is preferable that the nozzle diameter is within a range of from 10 μm to 100 μm. Further, it is not necessary for the nozzle opening portions themselves to be perfectly circular. If they are not perfectly circular, then the term "nozzle diameter" indicates the diameter of a circle having the same area as the area of the nozzle opening portion.

In the ink ejection process, to adjust the temperature of the ink at the time of ejection and to improve wiping properties, the temperature of the ink at the time of ejection is preferably 30° C. or more, and more preferably 35° C. or more. For ink stability and ejection reliability, the temperature of the ink is preferably 70° C. or less.

In order to reduce ink adhesion, it is preferable that the surface of the nozzles is treated with an ink-repellant. By coating the nozzles with a perfluoro polymer such as PTFE, PFA or FEP, a particularly excellent liquid repellant function can be obtained.

Ink Removal Process

In the ink removal process, a maintenance liquid is applied to an inkjet head (for example, a vicinity of the head, an ink flow path, and the like, hereinafter referred to as "a head and the like") in order to remove an ink or a solidified ink fouling from a nozzle surface of a head. The application of the maintenance liquid to the head and the like may make, a solidified ink originated from the ink on a nozzle surface, easier to be dissolved or swelled whereby the solidified ink can be easily removed.

Substances derived from solidified ink may be removed by scraping with a blade or wiping with a cloth or paper before or after applying the maintenance liquid. Preferable examples of the method of removing a solidified ink fouling include: scraping off of solidified ink by abrading (wiping) a nozzle head with a wiper blade after applying a maintenance liquid; and removal of solidified ink by air pressure or liquid pressure of a maintenance liquid or the like; and wiping with a cloth or paper. In particular, scraping with a blade or wiping with a cloth or paper is preferable.

The material of the wiper blade is preferably an elastic rubber. Specific examples of the material include butyl rubber, chloroprene rubber, ethylene propylene rubber, silicone rubber, urethane rubber, and nitrile rubber. A wiper blade coated with a fluoro resin or the like for imparting ink repellance may be used.

Since the specific ink composition described above is used in the image forming method of the present invention, a solidified ink fouling originated from an ink composition on a nozzle surface can be easily scraped off as a solid.

After forming an image by ejecting an ink onto a recording medium in an ink application process, the image forming method of the present invention may further include a process of fixing an image by heating the recording medium (thermal fixing process).

A method of drying and removing an ink solvent is not particularly limited, as long as the method can dry and remove the ink solvent (water or a solvent) included in an ink composition ejected onto the recording medium, and may be appropriately selected according to the desired purpose.

The method of the thermal fixing is not particularly limited as long as the method can soften polymer particles included in an ink composition and impart rubbing resistance to an image, and may be appropriately selected according to the desired purpose.

The recording medium used in the present invention is not particularly limited, and specific examples thereof include plain paper, bond paper, coated paper and the like.

Aggregation Liquid Application Process

In the aggregation liquid application process, it is preferable to provide a process of applying, onto a recording medium, an aggregation liquid containing an aggregating agent capable of forming an aggregate when the aggregation liquid contacts the already described ink composition before or after the already described ink application process using the ink composition so that an image can be formed by the contact of the ink composition with the aggregation liquid.

In the present invention, it is preferred to apply an ink composition onto an image recording medium after the application of the aggregation liquid. In other words, in preferable embodiments, the aggregation liquid for aggregating particles of pigment or the like included in the ink composition is applied on the recording medium in advance of applying the ink composition, and then the ink composition is applied so that it contacts an aggregation system which is formed by the aggregation liquid on the recording medium, thereby forming an image. As a result, the speed up of inkjet recording can be achieved, and an image having a high density and high resolution can be obtained even when recording is performed at a high speed.

In the ink jet recording method of the present invention, it is possible to use an intermediate transfer body as an a recording medium on which an image is to be recorded at first. Namely, in this embodiment, the ink jet recording method may include: a process of applying, onto an intermediate transfer body, the ink composition used in the invention, by an inkjet method; a process of applying, onto the intermediate transfer body, an aggregation liquid capable of forming a coagulate on the intermediate transfer body when the aggregation liquid contacts the ink composition, so that the ink composition and the aggregation liquid are brought into contact with each other to form an image on the intermediate transfer body; and a process of transferring the thus-formed image on the intermediate transfer body to a desired recording medium as a final recorded media. Also in this embodiment, it is preferred that the ejection of the ink composition is performed after the application of the aggregation liquid.

An image is recorded using the ink composition or the ink set according to the present invention, whereby the image-recorded matter having a suppressed curl can be obtained.

Exemplary aspects of the present invention are enumerated below.

<1> A maintenance liquid for inkjet recording comprising at least water, an organic solvent, a basic compound and an acidic compound, and having pH of from 6.0 to 8.5.
<2> The maintenance liquid for inkjet recording according to <1>, wherein a pKa value of the basic compound is in the range of 6.0 to 8.5.
<3> The maintenance liquid for inkjet recording according to <1> or <2>, wherein the basic compound is contained in an amount of 5 m mol/L or more.
<4> The maintenance liquid for inkjet recording according to any one of <1> to <3>, wherein the basic compound is an organic basic compound, and the acidic compound is an inorganic acid.
<5> The maintenance liquid for inkjet recording according to any one of <1> to <4>, wherein the organic solvent is a water-soluble organic solvent represented by the following Formula (1).

Formula (1)

In Formula (1), $R_2$ represents an ethylene groupor a propylene group; $R_1$ and $R_3$ each independently represent a hydrogen atom or an alkyl group having 1 to 4 carbon atoms; and x represents an integer of 1 to 4.
<6> The maintenance liquid for inkjet recording according to any one of <1> to <5>, wherein an SP value of the water-soluble organic solvent is 27.5 or less.
<7> The maintenance liquid for inkjet recording according to any one of <1> to <6>, wherein the acidic compound is contained in an acid equivalent amount of 0.05 to 0.95 equivalents to the basic compound.
<8> An ink set for inkjet recording including a water based ink composition having pH of 7 to 10, and the maintenance liquid for inkjet recording according to any one of <1> to <7>.
<9> The ink set for inkjet recording according to <8>, wherein the water-based ink composition includes at least a pigment and polymer particles.
<10> The ink set for inkjet recording according to <9>, wherein the pigment is dispersed with a pigment dispersant.
<11> The ink set for inkjet recording according to any one of <8> to <10>, further including an aggregation liquid containing an aggregating agent for aggregating components in the water-based ink composition.
<12> An image forming method using the ink set according to any one of <8> to <11>, wherein the method includes: applying an ink onto a recording medium by jetting the water-based ink composition from an inkjet head; and removing the ink composition attached to the inkjet head using the maintenance liquid.
<13> The image forming method according to <12>, further including applying an aggregation liquid containing an aggregating agent for aggregating components in the water-based ink composition onto the recording medium.

The term "maintenance" used in the present invention includes a meaning of keeping and continuing an inkjet head that ejects an ink composition for inkjet recording and ejection properties in a desired condition, or a condition close to the desired condition (i.e., maintenance), and an additional meaning of improving and maintaining a recording head in more favorable condition by rinsing (cleaning) the recording head. The maintenance liquid also includes a washing liquid for washing out an ink composition.

EXAMPLES

Hereinafter, the present invention will be described in more detail with reference to the following examples, although the present invention is not limited to these examples. "Parts" and "%" indicate quantities in terms of weight, unless otherwise specified.

The weight average molecular weight was herein measured by gel permeation chromatography (GPC). In the GPC, the measurement was carried out by the use of HLC-8020GPC (trade name, manufactured by Tosoh Corporation), three columns of TSK GEL, SUPER MULTIPORE HZ-H (trade name, manufactured by Tosoh Corporation; 4.6 mmID×15 cm), and THF (tetrahydrofuran) as an elute. The measurement was performed using an IR detector under the conditions of a sample concentration of 0.35% by mass, a flow rate of 0.35 ml/min., an injection amount of sample of 10 μl, and a measurement temperature of 40° C. Calibration curves was prepared by eight samples of "REFERENCE SAMPLE TSK STANDARD, POLYSTYRENE" of "F-40", "F-20", "F-4", "F-1", "A-5000", "A-2500", "A-1000" and "n-propylbenzene" (all trade names, manufactured by Tosoh Corporation).

The measurement of surface tension was performed using AUTOMATIC SURFACE TENSIOMETER CBVP-Z (trade name, manufactured by Kyowa Interface Science Co., Ltd.) under the conditions of 25° C. in accordance to a Wilhelmy method using a platinum plate. The viscosity was measured by VISCOMETER TV-22 (trade name, manufactured by TOKI SANGYO CO. LTD) under the conditions of 30° C. The pH was measured by a pH meter WM-50EG (trade name, manufactured by DKK-TOA CORPORATION) at a temperature of 25° C.±1° C.

Materials used in Examples were prepared as described below.

Preparation of Self-Dispersible Polymer Particles A-01

360.0 g of methyl ethyl ketone was placed in a 2 L three-necked flask equipped with a stirrer, a thermometer, a reflux condenser tube, and a nitrogen gas introducing tube, and the temperature was raised to 75° C. Thereafter, while maintaining the temperature inside the flask at 75° C., a mixed solution containing 162.0 g of methyl methacrylate, 126.0 g of isobornylmethacrylate, 50.4 g of "PME-100" (trade name, manufactured by NOF CORPORATION, methoxypolyethyleneglycol methacrylate (n=2)), 21.6 g of methacrylic acid, 72 g of methyl ethyl ketone, and 1.44 g of V-601 (trade name, manufactured by Wako Pure Chemical Ind. Ltd.) was added dropwise at a constant rate so that the dropwise addition was completed in 2 hours. After completion of the dropping, a solution containing 0.72 g of V-601 (described above) and 36.0 g of methyl ethyl ketone was added, and stirred at 75° C. for 2 hours. Further, a solution containing 0.72 g of V-601 (described above) and 36.0 g of methyl ethyl ketone was added, and stirred at 75° C. for 2 hours. Thereafter, the temperature was raised to 85° C., and the stirring was continued for further 2 hours, thereby obtaining a resin solution of a methyl methacrylate/isobornylmethacrylate/PME-100/methacrylic acid (=45/35/14/6 [mass ratio]) copolymer.

The weight average molecular weight (Mw) of the obtained copolymer was 65,000 (calculated by gel permeation chromatography (GPC) in terms of polystyrene) and the acid value was 39 (mgKOH/g). Further, the glass transition temperature (Tg) was 92° C.

Next, 668.3 g of the obtained resin solution was weighed, and 388.3 g of isopropanol and 145.7 ml of aqueous 1 mol/L NaOH solution were added. Then, the temperature inside the reactor was raised to 80° C. Next, 720.1 g of distilled water was added dropwise at a rate of 20 ml/min so that the copolymer resin is dispersed in water. Thereafter, the resultant was held under an atmospheric pressure at a temperature inside the reactor of 80° C. for 2 hours, and then maintained at 85° C. for 2 hours, and then further maintained at 90° C. for 2 hours. Then, the pressure inside the reactor was reduced, and the isopropanol, methyl ethyl ketone, and distilled water were distilled off in the total amount of 913.7 g, to obtain water dispersion (emulsion) of the self-dispersible polymer particles A-01 having a solid content of 28.0% by mass.

Preparation of Water-Insoluble Polymer Dispersant

A water-insoluble resin used as a water-insoluble polymer dispersant was synthesized according to the following scheme.

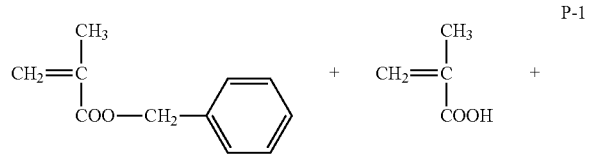

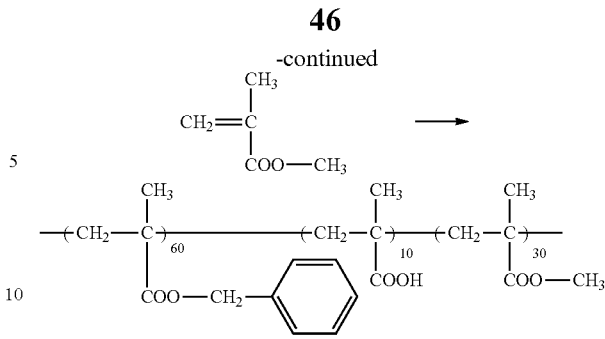

P-1

Methyl ethyl ketone (88 g) was placed in a 1000 ml three-necked flask equipped with a stirrer and a condenser tube, and heated to 72° C. under a nitrogen atmosphere. Separately, 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone to form a solution. The solution was added dropwise to the liquid in the flask over three hours. After the dropwise addition was completed, the reaction was further continued for one hour. Then, a solution obtained by dissolving 0.42 g of dimethyl 2,2'-azobisisobutyrate in 2 g of methyl ethyl ketone was added to the reaction solution, and the reaction solution was heated to 78° C. and heated at this temperature for 4 hours. The obtained reaction solution was reprecipitated twice with an excess quantity of hexane, and the precipitated resin was dried to obtain 96 g of the resin dispersant P-1 (water-insoluble resin).

The formulation of the obtained resin was identified with $^1$H-NMR. The weight average molecular weight (Mw) was determined by a GPC method, and was found to be 44,600. Furthermore, the acid value of the polymer was obtained in accordance with the method described in JIS Standard (JIS-K0070 (1992) and was found to be 65.2 mgKOH/g.

Preparation of Cyan Pigment Dispersion Liquid C 5.0 g (solid content conversion) of a liquid containing the above-obtained water-insoluble polymer dispersant, 10.0 g of PIGMENT BLUE 15:3 (trade name, manufactured by Dainichiseika Color & Chemicals Mfg. Co., Ltd.) as a cyan pigment, 40.0 g of methyl ethyl ketone, 8.0 g of 1 mol/L sodium hydroxide 82.0 g of ion exchange water, and 300 g of 0.1 mm zirconea beads were fed to a vessel, and dispersed by READY MILL DISPERSOR (trade name, manufactured by IMEX) at the rate of 1000 rpm for 6 hours. The thus-obtained pigment dispersion liquid was concentrated under reduced pressure by an evaporator until methyl ethyl ketone was substantially distilled away. Specifically, the dispersion liquid was concentrated until the pigment density became 12% by mass.

After that, the dispersion liquid was subjected to a centrifugal treatment at the rate of 8000 rpm for 30 minutes. As a result, coarse particles remaining as a precipitate were removed. Absorbance of the supernatant liquid was measured to determine the pigment density.

As described above, a cyan pigment dispersion liquid as a coloring material was prepared. Average particle size was 97 nm and aging particle size was 99 nm.

Preparation of Water-Soluble Organic Solvent

Details of water-soluble organic solvents used in the present Examples are described below.

GP 250: SANNIX 250 (trade name, manufactured by Sanyo Chemical Industries, Ltd., oxypropylene glyceryl ether represented by the following formula, SP value=26.4)

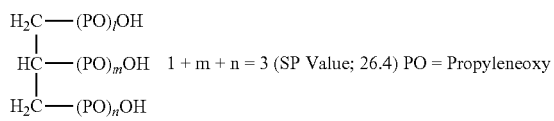

DEGmBE: Diethylene glycol monobutyl ether, manufactured by Wako Pure Chemical Industries, Ltd. (SP value=21.5)

TEGmBE: Triethylene glycol monobutyl ether, manufactured by Wako Pure Chemical Industries, Ltd. (SP value=21.1)

DEGmEE: Diethylene glycol monoethyl ether, manufactured by Wako Pure Chemical Industries, Ltd. (SP value=22.4)

TPGmME: Tripropylene glycol monomethyl ether, manufactured by Wako Pure Chemical Industries, Ltd. (SP value=20.4)

TEG: Triethylene glycol, manufactured by Wako Pure Chemical Industries, Ltd. (SP value=27.8)

Example 1

1. Preparation of Ink Composition

Using the above-obtained cyan pigment dispersion liquid C and a dispersion of self-dispersing polymer particles A-01, ingredients incorporated therein were mixed so as to be the following percentage composition, thereby preparing a water-based ink. The water-based ink obtained above was packed in a plastic disposable syringe, and then filtrated through a polyvinylidene (PVDE) filter having pore sizes of 5 μm (MILLEX-SV, manufactured by Millipore Corporate, diameter of 25 mm). Thus, a finished ink was prepared.

| | |
|---|---|
| Cyan pigment (Pigment blue 15:3) | 2.5% |
| The above-described water-insoluble polymer dispersant (solid content) | 1.25% |
| Aqueous dispersion of the above-described self-dispersing polymer particles A-01 (solid content) | 8.0% |
| SANNIX GP 250 (SP value = 26.4) | 8.0% |
| TPGmME (SP value = 20.4) | 8.0% |
| OLFINE E1010 (trade name, manufactured by Nissin Chemical Industry Co., Ltd, surfactant) | 1.0% |
| Ion exchange water | 71.25% |

The pH of the ink composition (undiluted solution) was adjusted to 8.3.

2. Preparation of Aggregation Liquid

Components shown in the following formulation was mixed to prepare an aggregation liquid. The viscosity, surface tension, and pH (25±1° C.) of the aggregation liquid were measured to turn out to be 4.9 mPa·s, 24.3 mN/m, and 1.5, respectively. The measurement of the viscosity, surface tension, and pH were performed in the same manner as those for the ink composition.

| Formulation of Aggregation Liquid | |
|---|---|
| Dimethylamine/Epichlorohydrin copolymer (Polymerization ratio 1:1, Weight average molecular weight 6000) | 5% by mass |
| DEGmEE (a product of Wako Pure Chemical Ind. Ltd.) | 20.0% by mass |
| ZONYL FSN-100 (trade name, manufactured by DuPont) | 1.0% by mass |
| Ion exchange water | 74% by mass |

3. Preparation of Maintenance Liquid

The addition amount of each ingredient written in number represents a percentage by mass. The pH value is a value measured immediately after preparation of the maintenance liquid.

Maintenance Liquid of the Present Invention

| Maintenance Liquid 1 | |
|---|---|
| DEGmBE | 25% |
| Trishydroxymethylaminomethane | 0.9% |
| 1N hydrochloric acid | 3% |
| Ion exchange water | 71.1% |
| (pH 7.53) | |

The addition amount of hydrochloric acid corresponds to about 0.4 equivalents of trishydroxymethylaminomethane in an acid equivalent.

| Maintenance Liquid 2 | |
|---|---|
| DEGmBE | 25% |
| Trishydroxymethylaminomethane | 0.15% |
| 1N hydrochloric acid | 1.0% |
| Ion exchange water | 73.85% |
| (pH 7.51) | |

The addition amount of hydrochloric acid corresponds to about 0.8 equivalents of trishydroxymethylaminomethane in an acid equivalent.

| Maintenance Liquid 3 | |
|---|---|
| DEGmBE | 25% |
| Trishydroxymethylaminomethane | 0.12% |
| 1N hydrochloric acid | 0.8% |
| Ion exchange water | 74.08% |
| (pH 7.39) | |

The addition amount of hydrochloric acid corresponds to about 0.8 equivalents of trishydroxymethylaminomethane in an acid equivalent.

| Maintenance Liquid 4 | |
|---|---|
| DEGmBE | 25% |
| Imidazole | 0.51% |
| 1N hydrochloric acid | 1.2% |
| Ion exchange water | 73.29% |
| (pH 7.53) | |

The addition amount of hydrochloric acid corresponds to about 0.2 equivalents of imidazole in an acid equivalent.

| Maintenance Liquid 5 | |
|---|---|
| DEGmBE | 25% |
| Imidazole | 0.34% |
| 1N hydrochloric acid | 0.8% |
| Ion exchange water | 73.86% |
| (pH 7.51) | |

The addition amount of hydrochloric acid corresponds to about 0.2 equivalents of imidazole in an acid equivalent.

| Maintenance Liquid 6 | |
| --- | --- |
| DEGmBE | 25% |
| Imidazole | 0.136% |
| 1N hydrochloric acid | 0.32% |
| Ion exchange water | 74.54% |
| (pH 7.49) | |

The addition amount of hydrochloric acid corresponds to about 0.2 equivalents of imidazole in an acid equivalent.

| Maintenance Liqiuid 7 | |
| --- | --- |
| DEGmBE | 25% |
| Imidazole | 0.102% |
| 1N hydrochloric acid | 0.24% |
| Ion exchange water | 74.66% |
| (pH 7.49) | |

The addition amount of hydrochloric acid corresponds to about 0.2 equivalents of imidazole in an acid equivalent.

| Maintenance Liquid 8 | |
| --- | --- |
| TEGmBE | 25% |
| Trishydroxymethylaminomethane | 0.12% |
| 1N hydrochloric acid | 0.8% |
| Ion exchange water | 74.08% |
| (pH 7.38) | |

The addition amount of hydrochloric acid corresponds to about 0.8 equivalents of trishydroxymethylaminomethane in an acid equivalent.

| Maintenance Liquid 9 | |
| --- | --- |
| DEGmEE | 25% |
| Imidazole | 0.068% |
| 1N hydrochloric acid | 0.16% |
| Ion exchange water | 74.77% |
| (pH 7.28) | |

The addition amount of hydrochloric acid corresponds to about 0.2 equivalents of imidazole in an acid equivalent.

| Maintenance Liquid 10 | |
| --- | --- |
| TPGmME | 25% |
| Imidazole | 0.068% |
| 1N hydrochloric acid | 0.16% |
| Ion exchange water | 74.77% |
| (pH 7.40) | |

The addition amount of hydrochloric acid corresponds to about 0.2 equivalents of imidazole in an acid equivalent.

| Maintenance Liquid 11 | |
| --- | --- |
| TEG | 25% |
| Trishydroxymethylaminomethane | 0.12% |
| 1N hydrochloric acid | 0.8% |
| Ion exchange water | 74.08% |
| (pH 7.35) | |

The addition amount of hydrochloric acid corresponds to about 0.8 equivalents of trishydroxymethylaminomethane in an acid equivalent.

| Maintenance Liquid 12 | |
| --- | --- |
| DEGmBE | 25% |
| Triethanol amine | 0.3% |
| 1N hydrochloric acid | 1.5% |
| Ion exchange water | 73.85% |
| (pH 7.23) | |

The addition amount of hydrochloric acid corresponds to about 0.8 equivalents of triethanol amine in an acid equivalent.

Maintenance Liquid for Comparison

| Maintenance Liquid A | |
| --- | --- |
| DEGmBE | 25% |
| Ion exchange water | 75% |
| (pH 4.83) | |

| Maintenance Liquid B | |
| --- | --- |
| DEGmBE | 25% |
| 1N sodium hydroxide | 0.006% |
| Ion exchange water | 74.99% |
| (pH 10.22) | |

| Maintenance Liquid C | |
| --- | --- |
| DEGmBE | 25% |
| Triethanol amine | 0.3% |
| Ion exchange water | 74.7% |
| (pH 8.44) | |

| Maintenance Liquid D | |
| --- | --- |
| Triethylene glycol | 10% |
| Ethylene glycol | 25% |
| Ethanol | 45% |
| Ion exchange water | 20% |
| (pH 6.31) | |

| Maintenance Liquid E | |
|---|---|
| Propylene glycol | 25% |
| Isopropyl alcohol | 60% |
| Ion exchange water | 15% |
| (pH 7.8) | |

| Maintenance Liquid F | |
|---|---|
| Ethylene glycol | 10% |
| Ethanol | 20% |
| Isopropyl alcohol | 20% |
| Diethylene glycol | 10% |
| Ion exchange water | 40% |
| (pH 5.05) | |

| Maintenance Liquid G | |
|---|---|
| DEGmBE | 1% |
| TEG | 30% |
| OLFINE E1010 | 1.0% |
| Ion exchange water | 68% |
| (pH 7.22) | |

Storage Stability of Maintenance Liquid

Each of the maintenance liquids of the present invention and the maintenance liquids for comparison produced above was stored under the following conditions, and then pH thereof after storage was measured and compared to the pH immediately after preparation of the maintenance liquid described above, respectively.

Storage Condition 1: 7 days in an incubator of 60° C.
Storage Condition 2: 28 days at room temperature (about 25° C.)

The storage stability was evaluated on a basis of pH variation represented by the following formula according to the following criterion.

ΔpH=(pH immediately after preparation)−(pH after storage)

Criterion of Evaluation
A: ΔpH is 0.2 or less.
B: ΔpH is more than 0.2, and 0.5 or less.
C: ΔpH is more than 0.5, and 2.0 or less.
D: ΔpH is more than 2.0.

The obtained results were shown in Table 1.

The pH variation of each of the maintenance liquids of the present invention was small. In contrast, the pH variation of each of the maintenance liquids for comparison was large.

TABLE 1

| Maintenance Liquid No. | Immediately After Preparation pH | pH Variation Storage Condition 1 (60° C., 7 days) | pH Variation Storage Condition 2 (room temp., 28 days) | Note |
|---|---|---|---|---|
| 1 | 7.51 | A | A | Invention |
| 2 | 7.51 | A | A | Invention |
| 3 | 7.39 | A | A | Invention |
| 4 | 7.53 | A | A | Invention |
| 5 | 7.51 | A | A | Invention |
| 6 | 7.49 | A | A | Invention |
| 7 | 7.49 | A | A | Invention |
| 8 | 7.38 | A | A | Invention |
| 9 | 7.28 | A | A | Invention |
| 10 | 7.40 | A | A | Invention |
| 11 | 7.35 | A | A | Invention |
| 12 | 7.54 | A | A | Invention |
| A | 4.83 | C | B | Comparison |
| B | 10.22 | D | D | Comparison |
| C | 8.44 | D | D | Comparison |
| D | 6.31 | B | B | Comparison |
| E | 7.80 | A* | B | Comparison |
| F | 5.05 | A* | B | Comparison |
| G | 7.22 | D | C | Comparison |

A*: After storage, pH varies increasingly.

Image Formation and Evaluation

The ink compositions, aggregation liquids, and various maintenance liquids obtained above were combined to make ink sets.

TOKUBISH ART BOTH SIDE N (trade name, manufactured by Mitsubishi Paper Mill Limited, 84.9 g/m$^2$) as a recording medium was fixed on a stage movable to a predetermined straight direction at a speed of 500 mm/second. On to the recording medium, an aggregation liquid was coated with a wire coater so as to be a thickness of about 5 μm. Immediately after coating, the coated recording medium was dried at 50° C. for 2 seconds.

Evaluation of Maintenance Property

The inkjet composition was ejected so as to be an ejection amount of ink droplets of 3.5 pL and a coating amount of ink of 5 g/m$^2$ using a remodeled inkjet printer from GELJET GX 5000 printer (trade name, manufactured by Ricoh Company, Ltd.) as an inkjet recording apparatus. After the ejection, the maintenance liquid loaded in the inkjet printer was applied on to a nozzle surface of the head using a roller. Thereafter, under each of the following condition (1) to (3), the nozzle surface of the inkjet head was wiped using a wiper blade (hydrogenated NBR). Thereafter, whether re-ejection properties of the ink are satisfactory or not was judged based on the results of the re-ejection. Subsequently, maintenance properties were evaluated according to the following evaluation criteria.

Evaluation Criteria of Re-Ejection Properties
(1) When the ink jetting ratio, which was measured after performing blade wiping once immediately after completion of continuous ejection of the ink over 60 minutes, was 90% or more, the ink was evaluated as being satisfactory with respect to the condition (1).
(2) When the ink ejection ratio, which was measured after performing blade wiping once at a pause for 30 minutes after ejection of the ink continued over 1 minute, was 90% or more, the ink was evaluated as being satisfactory with respect to the condition (2).
(3) When no unevenness was observed in an image formed after blade wiping was performed once immediately after completion of continuous ejection of an ink over 10 minutes, the ink was evaluated being satisfactory with respect to the condition (3).

Measurement of Ink Ejection Ratio

All the nozzles were confirmed as being jetting ink when the experiments were started. Then, the number of ejection nozzles after completion of the experiments including the maintenance process was counted, and the ejection ratio was calculated as follows.

Ejection ratio(%)=(Number of nozzles capable of ejecting after maintenance)/(number of all nozzles)×100(%)

Evaluation Criteria
A: Satisfactory in three conditions
B: Satisfactory in two conditions
C: Satisfactory in one condition
D: Unsatisfactory in three conditions The obtained results were shown in Table 2.

Each of ink sets using the maintenance liquid of the present invention exhibited excellent maintenance properties, and an ejection head portion was well cleaned, whereby occurrence of clogging troubles of the head was suppressed.

TABLE 2

| | Maintenance Properties | | | |
|---|---|---|---|---|
| Maintenance Liquid No. | Maintenance Liquid Immediately After Preparation | Maintenance Liquid After Storage Condition 1 (60° C., 7 days) | Maintenance Liquid After Storage Condition 2 (room temp., 28 days) | Note |
| 1 | A | A | A | Invention |
| 2 | A | A | A | Invention |
| 3 | A | A | A | Invention |
| 4 | A | A | A | Invention |
| 5 | A | A | A | Invention |
| 6 | A | A | A | Invention |
| 7 | A | A | A | Invention |
| 8 | A | A | A | Invention |
| 9 | A | A | A | Invention |
| 10 | A | A | A | Invention |
| 11 | B | B | B | Invention |
| 12 | A | A | A | Invention |
| A | B | D | D | Comparison |
| B | A | D | D | Comparison |
| C | A | D | D | Comparison |
| D | B | C | D | Comparison |
| E | C | C | D | Comparison |
| F | C | C | D | Comparison |
| G | C | D | C | Comparison |

The phenomenon that pH of the maintenance liquids described in, for example, JP-A No. 2005-7703, or JP-A No. 2000-127419 reduces during storage, was made clear. There are various factors which contribute to pH reduction. Examples of the pH reduction include pH reduction caused by carbonic acid originated from carbon dioxide in air, and pH reduction caused by decomposition due to dissolved oxygen. Especially, the maintenance liquid containing glycol esters or alkylene glycol alkyl ethers decomposes due to dissolved oxygen, which results in pH reduction. The pH reduction causes reduction in cleaning capacity of the maintenance liquid. Further in the case where the maintenance liquid is used in combination with an inkjet ink containing a pigment and polymer particles, if an ejection head is rinsed with a pH-reduced maintenance liquid after inkjet recording using the ink, aggregation of ink is caused because the ink is likely to aggregate due to pH reduction, which results in conspicuous deterioration of cleaning properties.

The present invention has been made in view of the above-described circumstances. According to the present invention, it is possible to provide an inkjet maintenance liquid having excellent maintenance properties, and an ink set and an image forming method each of which is capable of maintaining stable ejection properties over a long period of time, whereby a desired image can be formed. Especially, the present invention makes it possible to provide an image forming method having excellent fixing property and rubbing resistance in combination, whereby a desired image can be stably formed over a long period of time.

All publications, patent applications, and technical standards mentioned in this specification are herein incorporated by reference to the same extent as if each individual publication, patent application, or technical standard was specifically and individually indicated to be incorporated by reference.

What is claimed is:

1. A maintenance liquid for inkjet recording comprising at least water, an organic solvent, a basic compound and an acidic compound, and having pH of from 6.0 to 8.5, wherein the acidic compound is contained in an acid equivalent amount of 0.05 to 0.95 equivalents to the basic compound.

2. The maintenance liquid for inkjet recording according to claim 1, wherein a pKa value of the basic compound is in the range of 6.0 to 8.5.

3. The maintenance liquid for inkjet recording according to claim 1, wherein the basic compound is contained in an amount of 5 m mol/L or more.

4. The maintenance liquid for inkjet recording according to claim 1, wherein the basic compound is an organic basic compound, and the acidic compound is an inorganic acid.

5. The maintenance liquid for inkjet recording according to claim 1, wherein the organic solvent is a water-soluble organic solvent represented by the following Formula (I):

$$R_1\text{—}(OR_2)_x\text{—}OR_3 \qquad \text{Formula (1)}$$

wherein, in Formula (I), $R_2$ represents an ethylene group or a propylene group; $R_1$ and $R_3$ each independently represent a hydrogen atom or an alkyl group having 1 to 4 carbon atoms; and x represents an integer of 1 to 4.

6. The maintenance liquid for inkjet recording according to claim 1, wherein the organic solvent is a water-soluble organic solvent and an SP value of the water-soluble organic solvent is 27.5 or less.

7. An ink set for inkjet recording comprising a water-based ink composition having pH of 7 to 10, and the maintenance liquid for inkjet recording according to claim 1.

8. The ink set for inkjet recording according to claim 7, wherein the water-based ink composition comprises at least a pigment and polymer particles.

9. The ink set for inkjet recording according to claim 8, wherein the pigment is dispersed with a pigment dispersant.

10. The ink set for inkjet recording according to claim 7, further comprising an aggregation liquid comprising an aggregating agent for aggregating components in the water-based ink composition.

11. An image forming method using the ink set according to claim 7, wherein the method comprises:
   applying an ink onto a recording medium by jetting the water-based ink composition from an inkjet head; and
   removing the ink composition attached to the inkjet head using the maintenance liquid.

12. The image forming method according to claim 11, further comprising applying an aggregation liquid comprising an aggregating agent for aggregating components in the water-based ink composition onto the recording medium.

* * * * *